(12) United States Patent
Fujioka et al.

(10) Patent No.: US 9,010,940 B2
(45) Date of Patent: *Apr. 21, 2015

(54) IMAGE PROJECTION APPARATUS
(71) Applicant: Ricoh Company, Ltd., Ohta-ku (JP)
(72) Inventors: Tetsuya Fujioka, Kanagawa (JP);
Yasutada Tsukioka, Kanagawa (JP);
Masamichi Yamada, Kanagawa (JP);
Naoyuki Ishikawa, Kanagawa (JP);
Hideo Kanai, Tokyo (JP)
(73) Assignee: Ricoh Company, Limited, Tokyo (JP)
( * ) Notice: Subject to any disclaimer, the term of this patent is extended or adjusted under 35 U.S.C. 154(b) by 0 days.

This patent is subject to a terminal disclaimer.

(21) Appl. No.: 14/454,446
(22) Filed: Aug. 7, 2014
(65) Prior Publication Data

US 2014/0347635 A1 Nov. 27, 2014

Related U.S. Application Data

(63) Continuation of application No. 13/665,349, filed on Oct. 31, 2012.

(30) Foreign Application Priority Data

Nov. 17, 2011 (JP) ................... 2011-252008

(51) Int. Cl.
*G03B 21/16* (2006.01)
*G03B 21/14* (2006.01)
(Continued)

(52) U.S. Cl.
CPC .............. *G03B 21/145* (2013.01); *G03B 21/16* (2013.01); *G03B 21/2066* (2013.01); *G03B 21/008* (2013.01)

(58) Field of Classification Search
CPC ... F21V 29/004; F21V 29/225; F21V 29/246; G03B 21/28

USPC ............... 353/30, 37, 52, 61, 79, 98, 119; 348/743–747, 787, 789, 794; 349/5, 349/7–9

See application file for complete search history.

(56) References Cited

U.S. PATENT DOCUMENTS 6,471,357 B1 10/2002 Hara et al.
7,185,988 B2 3/2007 Rogers et al.
(Continued)

FOREIGN PATENT DOCUMENTS

CN 1940720 A 1/2007
CN 101160548 A 4/2008
(Continued)

OTHER PUBLICATIONS

Japanese Office Action mailed Jul. 18, 2014 for Japanese Application No. 2011-252008.

(Continued)

*Primary Examiner* — Sultan Chowdhury
(74) *Attorney, Agent, or Firm* — Oblon, McClelland, Maier & Neustadt, L.L.P.

(57) ABSTRACT

According to an embodiment, an image projection apparatus includes a light source unit, an image forming unit that forms an image using light from the light source unit, and a heat releasing unit that is provided to the image forming unit and releases heat from the image forming unit, and projecting the image formed by the image forming unit. The image projection apparatus includes a facing member that faces an installation surface on which a main body of the apparatus is installed; and a foot that allows the facing member to support the image forming unit. The heat releasing unit is provided between the facing member and the image forming unit.

20 Claims, 28 Drawing Sheets

(51) Int. Cl.
   *G03B 21/20* (2006.01)
   *G03B 21/00* (2006.01)

(56) References Cited

U.S. PATENT DOCUMENTS

| | | | |
|---|---|---|---|
| 8,550,637 | B2 | 10/2013 | Seki |
| 2004/0032569 | A1 | 2/2004 | Takezawa et al. |
| 2004/0156117 | A1 | 8/2004 | Takaura et al. |
| 2005/0206854 | A1* | 9/2005 | Katase ............... 353/79 |
| 2005/0248731 | A1 | 11/2005 | Jung et al. |
| 2005/0264766 | A1* | 12/2005 | Morimoto et al. ........ 353/61 |
| 2006/0209266 | A1 | 9/2006 | Utsunomiya |
| 2007/0024814 | A1 | 2/2007 | Woo et al. |
| 2007/0252161 | A1 | 11/2007 | Meis et al. |
| 2009/0122499 | A1* | 5/2009 | Takeichi et al. ........ 361/796 |
| 2011/0188008 | A1* | 8/2011 | Maeda et al. ............ 353/85 |
| 2011/0279787 | A1* | 11/2011 | Yoshimura et al. ........ 353/57 |
| 2013/0114045 | A1 | 5/2013 | Fujioka et al. |
| 2013/0114050 | A1 | 5/2013 | Yamada et al. |
| 2013/0114274 | A1 | 5/2013 | Fujioka et al. |

FOREIGN PATENT DOCUMENTS

| | | |
|---|---|---|
| EP | 1 128 208 A1 | 8/2001 |
| GB | 1 231 600 | 5/1971 |
| JP | 11-119343 | 4/1999 |
| JP | 2004-219753 | 8/2004 |
| JP | 2005-024810 | 1/2005 |
| JP | 2005-338325 | 12/2005 |
| JP | 2006-259282 | 9/2006 |
| JP | 2006-301368 | 11/2006 |
| JP | 2007-248739 | 9/2007 |
| JP | 2008-134432 | 6/2008 |
| JP | 2009-071489 | 4/2009 |
| JP | 2009-532882 | 9/2009 |
| WO | WO 02/056110 | 7/2002 |
| WO | WO2007/133857 | 11/2007 |

OTHER PUBLICATIONS

U.S. Appl. No. 14/454,431, filed Aug. 7, 2014.

U.S. Appl. No. 14/454,416, filed Aug. 7, 2014.

Chinese Office Action dated Aug. 19, 2014 for Chinese Patent Application No. 201210598277.X with an English translation thereof.

Notice of Allowance issued Dec. 12, 2014 in co-pending U.S. Appl. No. 13/665,349.

* cited by examiner

IMAGE PROJECTION APPARATUS

CROSS-REFERENCE TO RELATED APPLICATIONS

The present application is a continuation application of U.S. application Ser. No. 13/665,349, filed Oct. 31, 2012, which claims priority to Japanese Patent Application No. 2011-252008 filed in Japan on Nov. 17, 2011. The entire contents of each of the above are incorporated herein by reference.

BACKGROUND OF THE INVENTION

1. Field of the Invention

The present invention relates to an image projection apparatus.

2. Description of the Related Art

Conventionally known is an image projection apparatus including image forming unit having a digital mirror device (DMD) being an image generating element for generating an image based on image data received from a personal computer or the like; and an irradiation unit for irradiating the image generating element with light from a light source. In such an image projection apparatus, an image is formed in the image forming unit, and the image formed by the image forming unit is imaged on a projection surface using a projecting optical unit (for example, Japanese Patent Application Laid-open No. 2008-134432).

Specifically, the light from the light source, traveling in parallel with the image generating surface of the DMD, is folded by an illuminating optical system such as a folding mirror toward the image generating surface, so that the image generating surface is irradiated with the light. On the image generating surface of the DMD, a plurality of movable micromirrors are arranged in a grid-like arrangement. The mirror surface of each of the micromirrors can be tilted by a given angle about a rotational axis so that two states of "ON" and "OFF" can be set. While a micromirror is "ON", the micromirror reflects the light from the light source toward the projecting optical unit. When the micromirror is "OFF", the micromirror reflects the light from the light source toward a light absorber provided inside of the apparatus. Therefore, by driving each of the mirrors independently, projection of light can be controlled for each pixel in image data so that the image can be generated. The image generated by the DMD passes through the projecting optical unit and imaged on the projection surface.

The applicant is currently developing an image projection apparatus in which the length of the image projection apparatus is reduced in a direction perpendicular to the plane of a projected image that is projected on the projection surface, by arranging components of the image projection apparatus in a direction perpendicular to an installation surface for the apparatus main unit, that is, a surface on which the apparatus main unit is installed, e.g., a table top, a wall surface, or a ceiling. When the projecting optical unit and the image forming unit are connected and arranged in the direction perpendicular to an installation surface of the apparatus main unit, and a heat releasing unit is to be provided to the image forming element and the image forming unit, the heat releasing unit needs to be arranged between a member facing the installation surface where the apparatus main unit is installed and the image forming unit, and the heat releasing unit needs to be kept away from the member facing the installation surface.

As a way for supporting the image forming unit and the projecting optical unit connected and arranged in the direction perpendicular to an installation surface while keeping the heat releasing unit for the image forming unit away from the member of the apparatus main unit facing the installation surface, the image forming unit and the projecting optical unit may be fixed on a surface facing both of the image forming unit and the projecting optical unit in a manner conventionally practiced. In other words, the image forming unit and the projecting optical unit may be fixed to a member including a surface perpendicular to the installation surface of the apparatus main unit. In such a configuration, the member including the surface perpendicular to the installation surface of the apparatus main unit is provided with supporting portions such as screw receptacles, for example, and the image forming unit and the projecting optical unit are fixed to the supporting portions. In this configuration, the weights of the image forming unit and the projecting optical unit are supported by the member including the surface perpendicular to the installation surface of the apparatus main unit.

Because a bending moment is applied by the weights of the image forming unit and the projecting optical unit to the supporting portions that are provided to the member including the surface perpendicular to the installation surface of the apparatus main unit, the member including the surface perpendicular to the installation surface of the apparatus main unit needs to have some strength. To increase the strength of the member including the surface perpendicular to the installation surface of the apparatus main unit, it is necessary to increase the thickness of the member including the surface perpendicular to the installation surface of the apparatus main unit, or to provide ribs to the member including the surface perpendicular to the installation surface of the apparatus main unit, for example. Therefore, a material cost for the member including the surface perpendicular to the installation surface of the apparatus main unit is increased; and therefore, the cost of the apparatus is increased disadvantageously.

Furthermore, if the image forming unit and the projecting optical unit are fixed to one of a plurality of members including the surface perpendicular to the installation surface of the apparatus main unit and surrounding the image forming unit and the projecting optical unit, the weight balance is lost and the image projection apparatus might become easier to fall down. By making the entire image projection apparatus heavy, the image projection apparatus could be prevented from falling due to the lost balance, but portability is reduced if the image projection apparatus is heavy.

The present invention is made in consideration of the above. There is a need to provide an image projection apparatus that does not require strength in a member including a surface perpendicular to an installation surface of the apparatus main unit when optical units such as an image forming unit and a projecting optical unit are arranged in a direction perpendicular to the installation surface.

SUMMARY OF THE INVENTION

It is an object of the present invention to at least partially solve the problems in the conventional technology.

According to an embodiment, there is provided an image projection apparatus that includes a light source unit, an image forming unit that forms an image using light from the light source unit, and a heat releasing unit that is provided to the image forming unit and releases heat from the image forming unit, and projecting the image formed by the image forming unit. The image projection apparatus includes a facing member that faces an installation surface on which a main body of the apparatus is installed; and a foot that allows the facing member to support the image forming unit. The heat releasing unit is provided between the facing member and the image forming unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
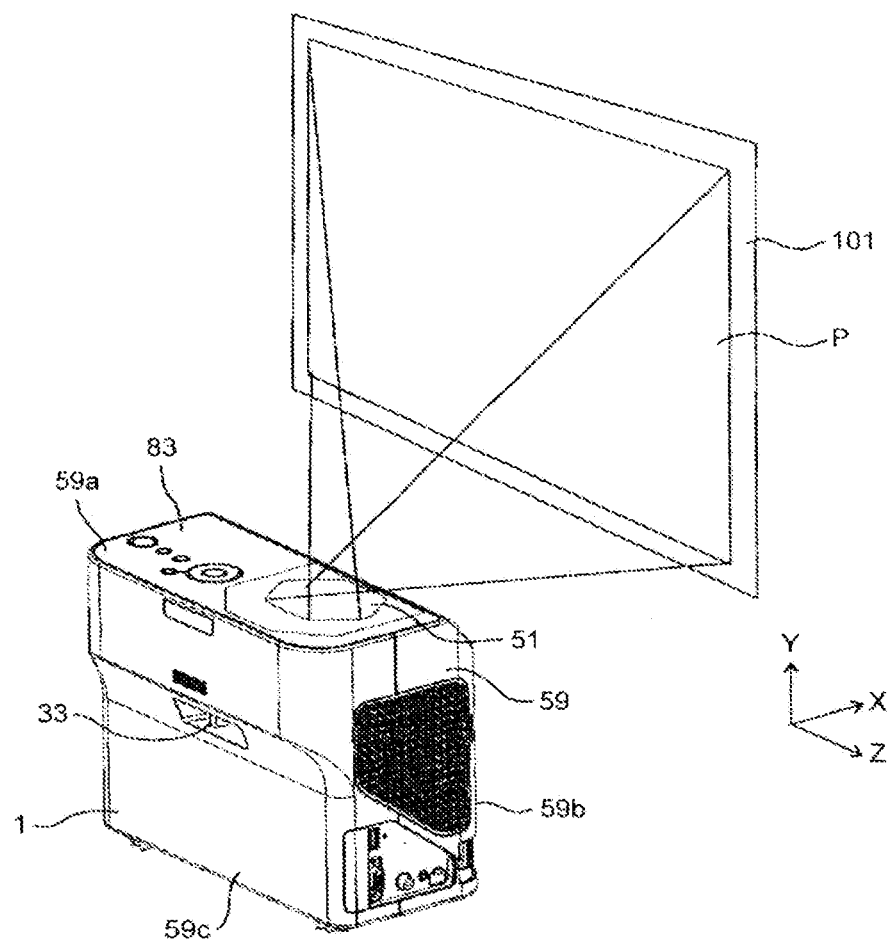
FIG. 1 is a perspective view illustrating a projector according to an embodiment and a projection surface.

An embodiment applied to a projector will now be explained. FIG. 1 is a perspective view illustrating a projector 1 according to the embodiment and a projection surface 101 such as a screen. In the explanations below, the normal direction of the projection surface 101 is referred to as an X direction, and a short side direction (vertical direction) of the projection surface is referred to as a Y direction, and a longitudinal direction (horizontal direction) of the projection surface 101 is referred to as a Z direction.

An embodiment in which an image projection apparatus is applied as a projector will now be explained. FIG. 1 is a perspective view illustrating a projector 1 according to the embodiment and a projection surface 101 such as a screen. In the explanations below, the normal direction of the projection surface 101 is referred to as an X direction, and a short side direction (vertical direction) to the projection surface is referred to as a Y direction, and a longitudinal direction (horizontal direction) of the projection surface 101 is referred to as a Z direction.

As illustrated in FIG. 1, a transmissive glass 51 through which a projected image P is output is provided on the top surface of the projector 1. The projected image P output from the transmissive glass 51 is projected on the projection surface 101 such as a screen.

An operating unit 83 for allowing a user to operate the projector 1 is also provided on the top surface of the projector 1. A focus lever 33 for adjusting the focus is provided on a side surface of the projector 1.

Figure 2:
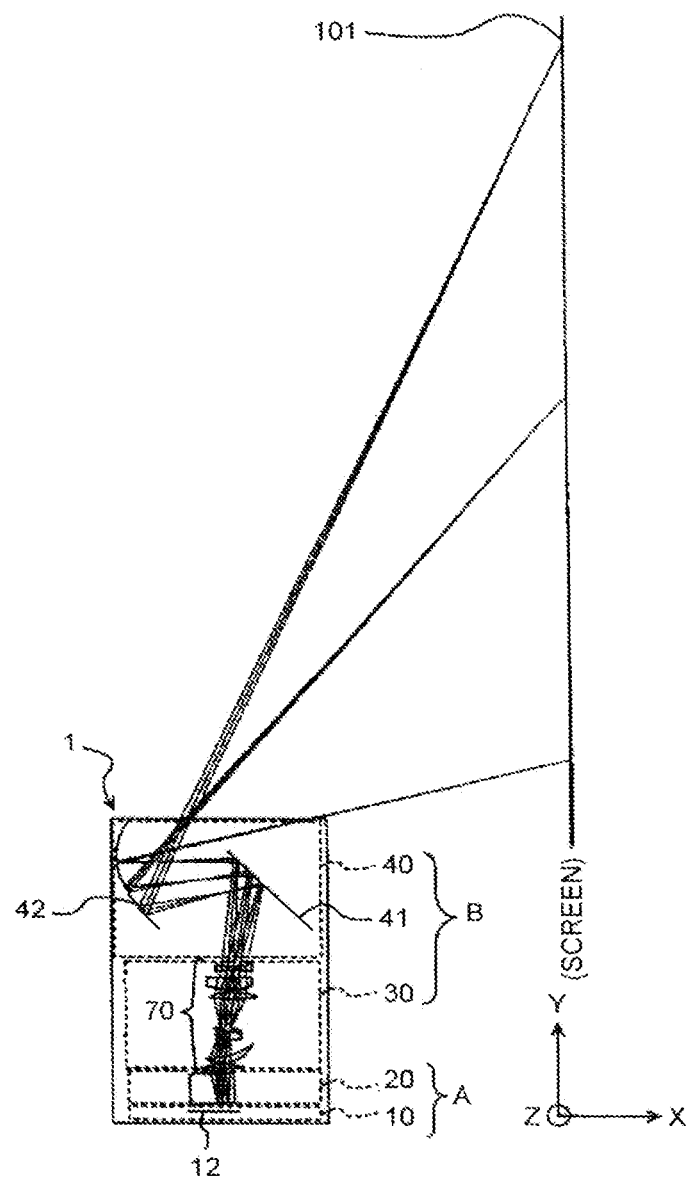
FIG. 2 is a schematic of an optical path from the projector to the projection surface.

FIG. 2 is a schematic of an optical path from the projector 1 to the projection surface 101.

The projector 1 includes a light source unit not illustrated and having a light source, and the image forming unit A that forms an image using light from the light source. The image forming unit A includes an image forming unit 10 having a digital mirror device (digital micro mirror device, or DMD) 12 as an image forming element, and an illumination unit 20 that folds the light from the light source to irradiate the DMD 12 with the light, to allow the DMD 12 to generate the image. The projector 1 also includes a projecting optical unit B for projecting the image on the projection surface 101. The projecting optical unit B is provided with at least one transmissive refractive optical system; and includes a first optical unit 30 having a first optical system 70 that is a coaxial system having a positive power, and a second optical unit 40 including a folding mirror 41 and a curved mirror 42 that has a positive power. An enclosure, in which optical units such as the image forming unit A and the projecting optical unit B are enclosed, is referred to as an outer cover 59 as illustrated in FIG. 1. A surface of the outer cover 59 having the transmissive glass 51 is referred to as a cover top surface 59a. A surface near to the projection surface 101 is referred to as a cover front surface 59b. A surface away from the projection surface 101 is referred to as a cover rear surface 59c. A first member facing an installation surface that is the surface on which the projector 1 is installed is referred to as a base member 53; and the remaining surfaces are referred to as cover side surfaces 59*d*.

The DMD 12 is irradiated with the light from the light source not illustrated via the illumination unit 20, and generates an image. The image generated by the DMD 12 is projected on the projection surface 101 via the first optical system 70 in the first optical unit 30, and the folding mirror 41 and the curved mirror 42 in the second optical unit 40.

Figure 3:
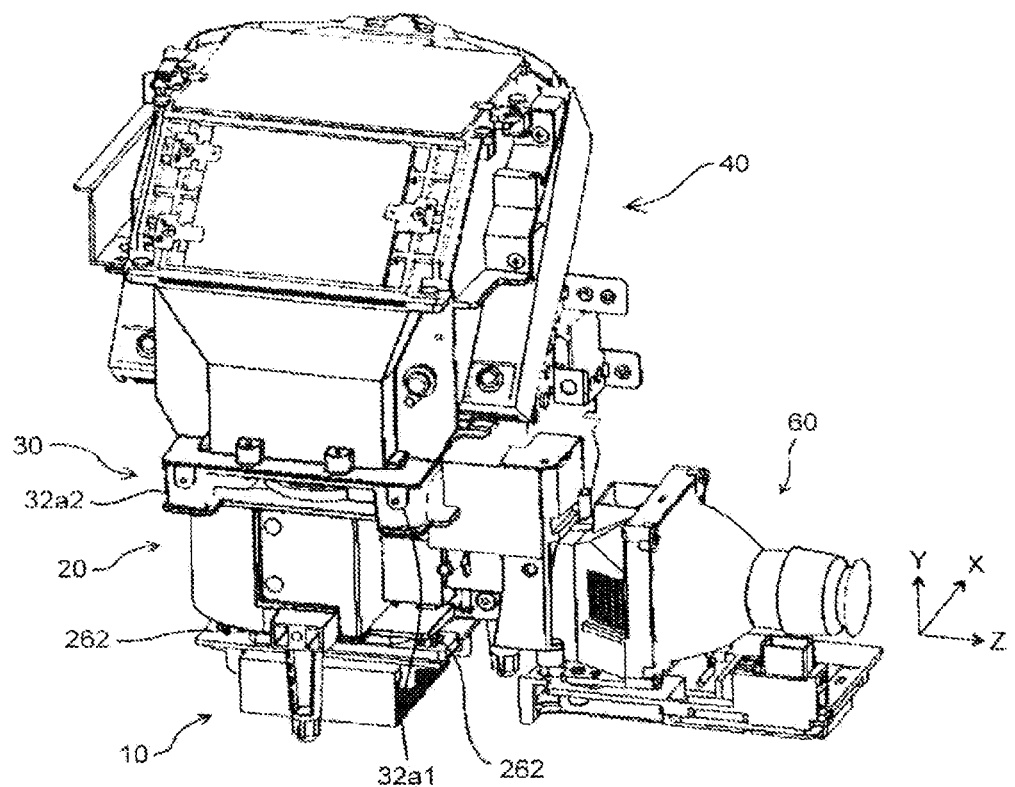
FIG. 3 is a schematic perspective view illustrating an internal structure of the projector.

FIG. 3 is a schematic perspective view illustrating an internal structure of the projector 1.

As illustrated in FIG. 3, the image forming unit 10, the illumination unit 20, the first optical unit 30, and the second optical unit 40 are arranged along the Y direction that is a direction in parallel with the projection surface. The light source unit 60 is disposed on the right side of the illumination unit 20 in FIG. 3.

The reference numerals 32*a*1 and 32*a*2 illustrated in FIG. 3 indicate feet provided on a lens holder 32 included in the first optical unit 30. The reference numeral 262 indicates a screw fixing portion for fixing the image forming unit 10 to the illumination unit 20 using a screw.

A structure of each of these units will now be explained in detail.

To begin with, the light source unit 60 will be explained.

Figure 4:
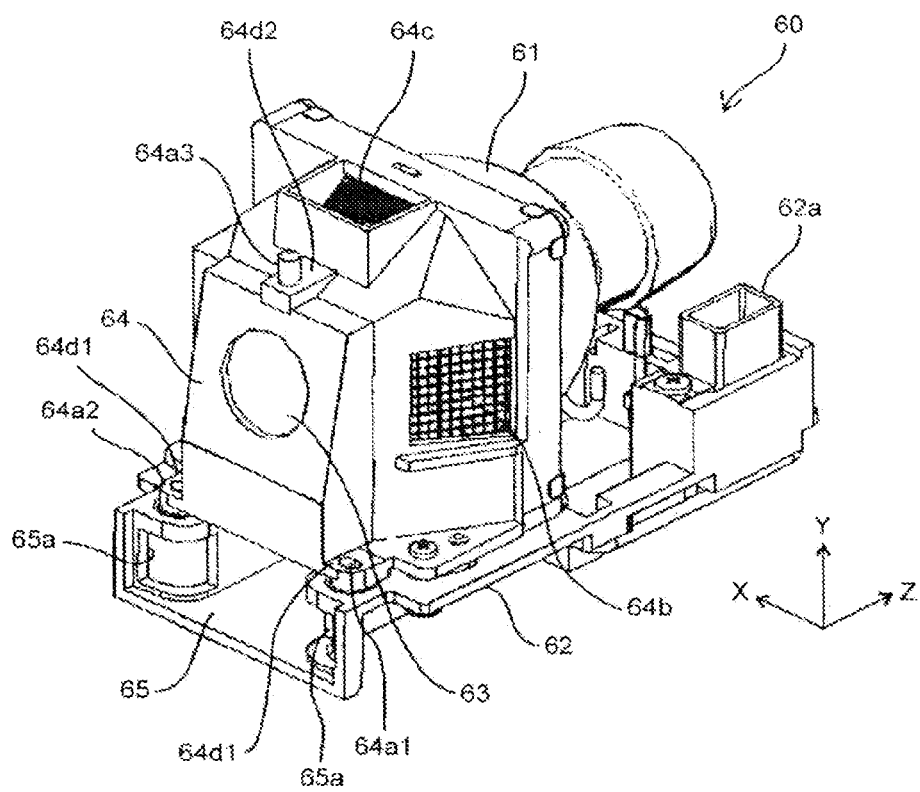
FIG. 4 is a schematic perspective view of a light source unit.

FIG. 4 is a schematic perspective view of the light source unit 60.

The light source unit 60 includes a light source bracket 62 on which a light source 61 such as a halogen lamp, a metal halide lamp, or a high-pressure mercury lamp is mounted. A connector 62*a* to which a power-supply side connector not illustrated and connected to a power unit 80 (see FIG. 28) is also provided on the light source bracket 62.

A holder 64 for holding a reflector not illustrated and the like is fixed to the light source bracket 62 with screws, on an outgoing side of the light from the light source 61. An exit window 63 is formed on a surface of the holder 64 located on the opposite side of where the light source 61 is provided. The light output from the light source 61 is collected to the exit window via the reflector that is not illustrated and is held by the holder, and output from the exit window 63.

Light source aligning portions 64*a*1 to 64*a*3 for aligning the light source unit 60 with respect to an illumination bracket 26 in the illumination unit 20 (see FIG. 6) are provided on the X-direction ends of the top surface and the bottom surface of the holder 64. The light source aligning portion 64*a*3 provided on the top surface of the holder 64 has a shape of a protrusion, and the two light source aligning portions 64*a*1, 64*a*2 provided on the bottom surface of the holder 64 have a shape of a hole.

A light source air inlet 64*b* for collecting the air for cooling the light source 61 is provided on each side surface of the holder 64, except for the top surface. Provided on the top surface of the holder 64 is a light source air outlet 64*c* for discharging the air heated by heat of the light source 61.

The light source bracket 62 is also provided with a duct 65 for allowing the air suctioned by a suction blower 91 (see FIG. 21, for example) to enter in a manner to be described later. Provided on an incoming side of the duct 65, which is on the front side in FIG. 4, are openings 65*a* for allowing the air coming into the duct 65 to flow between the light source unit 60 and a removable cover 54 (see FIG. 7), which is to be described later. Cooling of the light source unit 60 will be described later.

As will be described later as well, a flat part 64*d*2 having the light source aligning portions (protrusions) 64*a*3 and flat parts 64*d*1 having the light source aligning portions (holes) 64*a*1, 64*a*2, respectively, illustrated in FIG. 4 function as abutting parts that abut against the illumination bracket when pressed by a pressing unit included in the removable cover.

The illumination unit 20 will now be explained.

Figure 5:
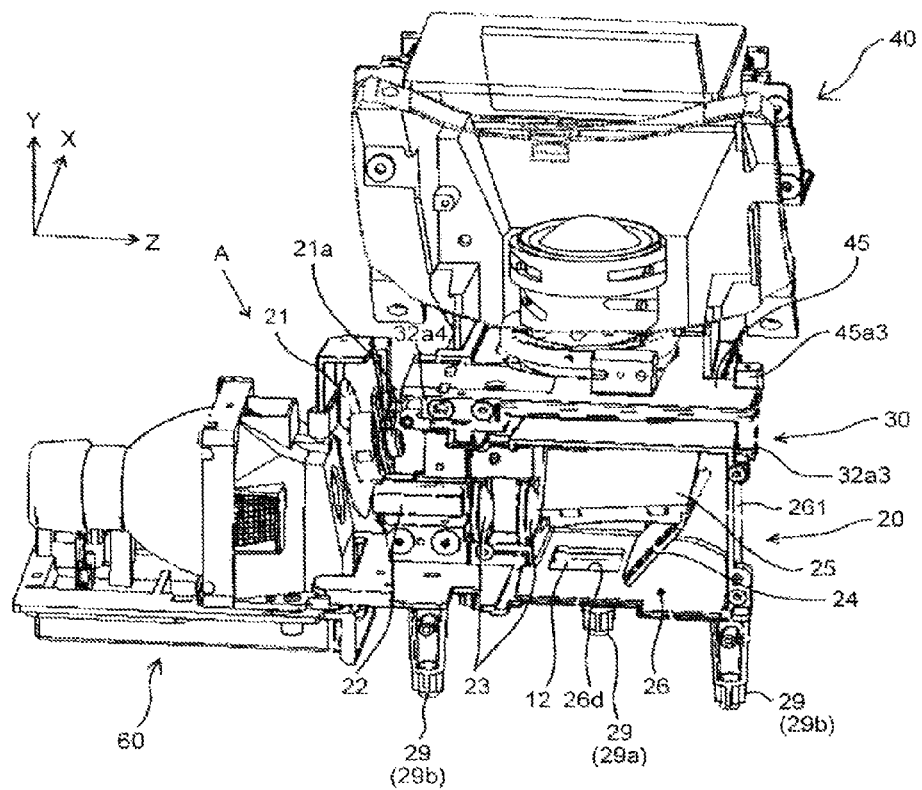
FIG. 5 is a perspective view illustrating optical system components housed in an illumination unit along with other units.

FIG. 5 is a perspective view illustrating optical system components provided in the illumination unit 20 along with other units.

As illustrated in FIG. 5, the illumination unit 20 includes a color wheel 21, a light tunnel 22, two relay lenses 23, a cylinder mirror 24, and a concave mirror 25 that are supported by the illumination bracket 26. The illumination bracket 26 has a housing-like part 261 in which the two relay lenses 23, the cylinder mirror 24, and the concave mirror 25 are housed. Among the four sides of the housing-like part 261, only the right side in FIG. 5 has a side surface, and other three sides are open. An OFF light plate 27 (see FIG. 6) is mounted on an opening on the side located on the rear side in the X direction in FIG. 5. A cover member not illustrated in any of the drawings is attached to the side located on the front side in the X direction in FIG. 5. In this manner, the two relay lenses 23, the cylinder mirror 24, and the concave mirror 25 housed in the housing-like part 261 of the illumination bracket 26 is covered by the illumination bracket 26, the OFF light plate 27 (see FIG. 6), and the cover member not illustrated in any of the drawings.

An illumination penetrating hole 26*d* for allowing the DMD 12 to be exposed is provided on the bottom surface of the housing-like part 261 of the illumination bracket 26.

The illumination bracket 26 also includes three feet 29. These feet 29 abut against a base member 53 (see FIG. 18) of the projector 1, and supports the weight of the first optical unit 30 and the second optical unit 40 fixed to the illumination bracket 26 in a manner provided on top of each other. The feet 29 are provided to ensure a space for allowing the external air to enter a heat sink 13 (see FIG. 6) being a heat releasing unit for releasing the heat generated by the DMD 12 in the image forming unit 10, so that the DMD 12 can be cooled. Because a member generally has a higher rigidity to an axial force than to a bending moment, sufficient rigidity for supporting the image forming unit A and the projecting optical unit B can be provided easily by the base member 53 and the feet 29. Therefore, the heat sink 13 is provided between the image forming unit A and the base member 53 without giving much consideration to the strength of the cover front surface 59*b*, the cover rear surface 59*c*, and the cover side surface 59*d*, compared with a structure in which the image forming unit A and the projecting optical unit B are fixed to the cover front surface 59*c*, the cover rear surface 59*c*, or the cover side surface 59*d* of the outer cover 59 illustrated in FIG. 1 mentioned earlier. Among the three feet 29, two feet 29*b* are respectively disposed on ends of a side of the illumination bracket 26 near the cover rear surface 59*c*. The remaining foot 29*a* among the three feet 29 is provided on a side of the illumination bracket 26 near the cover front surface 59*b*. By providing the three feet 29 in the manner described above, the imbalance between the image forming unit A and the projecting optical unit B caused by the curved mirror 42 can be eliminated.

The reference numerals 32*a*3, 32*a*4 in FIG. 5 indicate feet of the lens holder 32 in the first optical unit 30, and the reference numeral 45*a*3 indicates a threaded receptacle 45*a*3 on the second optical unit 40.

Figure 6:
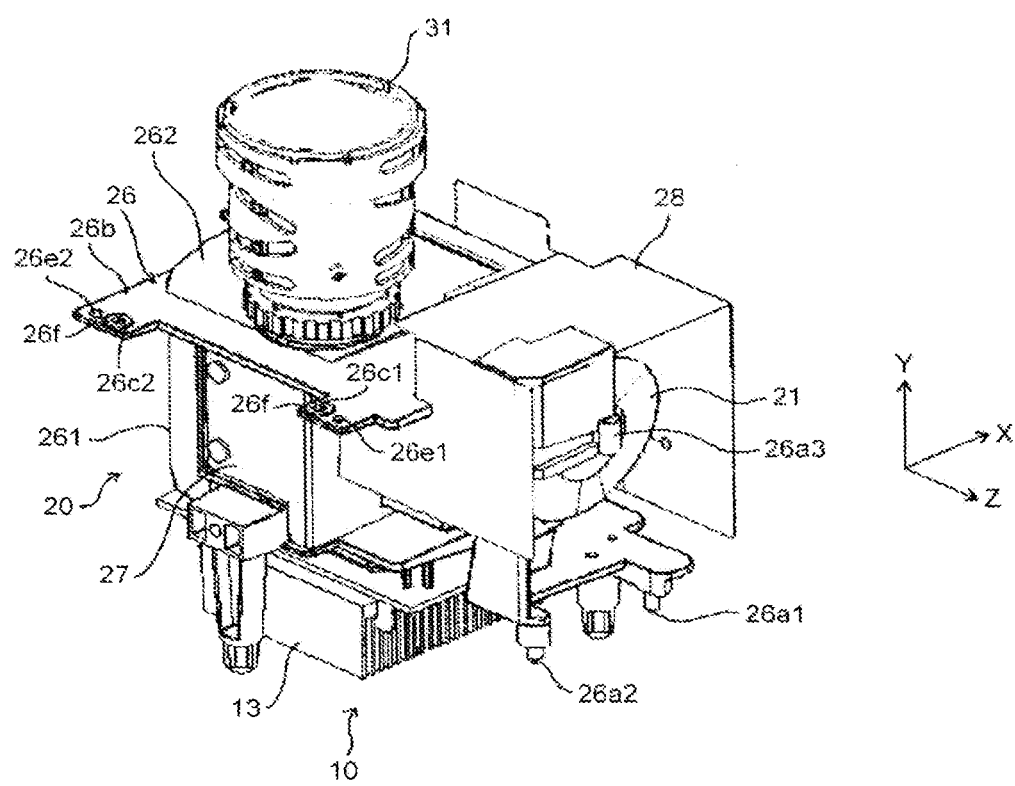
FIG. 6 is a perspective view of the illumination unit, a projection lens unit, and an image forming unit viewed from a direction A in FIG. 5.

FIG. 6 is a perspective view of the illumination unit 20, a projection lens unit 31, the image forming unit 10 viewed from the direction of A illustrated in FIG. 5.

Provided on the upper part of the housing-like part 261 of the illumination bracket 26 is a top surface 26*b* perpendicularly intersecting with the Y direction in FIG. 6. At four corners of the top surface 26b, penetrating holes through which screws for fastening the first optical unit 30 are provided (in FIG. 6, only penetrating holes 26c1 and 26c2 are illustrated, and the remaining penetrating holes are not illustrated). Aligning holes 26e1, 26e2 for aligning the first optical unit 30 with respect to the illumination unit 20 are also provided at respective positions adjacent to the penetrating holes 26c1, 26c2 located on the front side in the X direction in FIG. 6. Among the two aligning holes provided on the front side in the X direction in FIG. 6, the aligning holes 26e1 near where the color wheel 21 is disposed is used as a main reference in the alignment, and has a shape of a circular hole. The aligning holes 26e2 provided on the opposite side of where the color wheel 21 is disposed is used as a sub-reference in the alignment, and has a shape of a long hole extending in the Z direction. A peripheral of each of the penetrating holes 26c1, 26c2 is formed as an aligning protrusion 26f for aligning the first optical unit 30 in the Y direction, and protrudes from the top surface 26b of the illumination bracket 26. If the positioning precision in the Y direction is to be increased without providing the aligning protrusions 26f, the flatness of the entire top surface of the illumination bracket 26 needs to be increased. Therefore, a cost increases. By contrast, when the aligning protrusions 26f are provided, because the flatness needs to be increased on the aligning protrusions 26f only, the positioning precision in the Y direction can be increased while suppressing the cost.

Provided on an opening on the top surface of the illumination bracket 26 is a douser 262 that prevents light from entering the housing-like part 261 from above and with which the bottom part of the projection lens unit 31 is engaged.

A cutout is formed between the penetrating holes 26c1, 26c2 provided on the top surface 26b of the illumination bracket 26, so that the second optical unit 40 can be fixed to the first optical unit 30 using screws without being obstructed, in a manner to be described later.

Provided on an end of the illumination bracket 26 on the side of the color wheel 21 (on the front side in the Z direction in FIG. 6) is a tubular light source portion-to-be-aligned 26a3 having a penetrating hole extending in a up-and-down direction in which the light source aligning portion 64a3 (see FIG. 4) provided as a protrusion on the top surface of the holder 64 in the light source unit 60 is engaged. Provided below the light source portion-to-be-aligned 26a3 are two light source portions-to-be-aligned 26a1, 26a2 each of which has a shape of a protrusion and that are respectively engaged with the two light source aligning portions 64a1, 64a2 each having a shape of a hole and provided on the light source bracket 62 in the holder 64. When the three light source aligning portions 64a1 to 64a3 on the holder 64 are respectively engaged with the three light source portions-to-be-aligned 26a1 to 26a3 provided to the illumination bracket 26 in the illumination unit 20, the light source unit 60 is aligned and fixed to the illumination unit 20 (see FIG. 3).

To the illumination bracket 26, an illumination cover 28 for covering the color wheel 21 and the light tunnel 22 is also attached.

Figure 7:
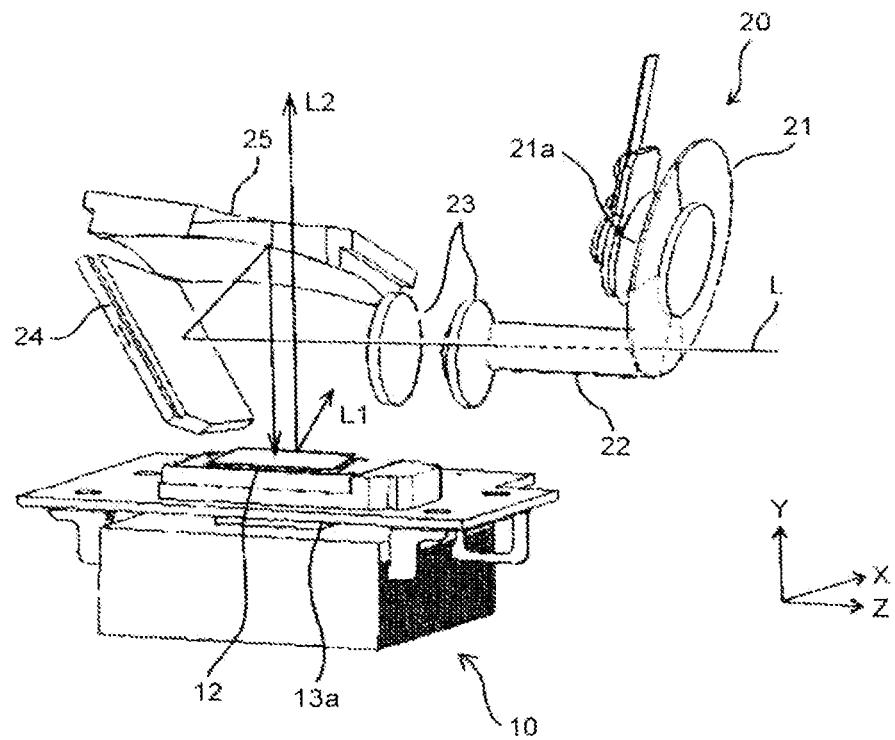
FIG. 7 is a schematic for explaining an optical path inside of the illumination unit.

FIG. 7 is a schematic for explaining an optical path L of the light within the illumination unit 20.

The color wheel 21 has a shape of a disk, and is fixed to a motor shaft of a color motor 21a. The color wheel 21 has filters, such as those in red (R), green (G), blue (B), and the like, in a rotating direction. The light collected by the reflector not illustrated and provided on the holder 64 in the light source unit 60 passes through the exit window 63, and reaches the edge of the color wheel 21. The light having reached the edge of the color wheel 21 is time-divided by the rotating color wheel 21 into R light, G light, and B light.

The light divided by the color wheel 21 becomes incident on the light tunnel 22. The light tunnel 22 has a shape of a rectangular tube, and has mirrors on the internal surface. The light incident on the light tunnel 22 is reflected a plurality of number of times on the internal surface of the light tunnel 22, homogenized into a plane light source, and goes out toward the relay lenses 23.

The light having passed through the light tunnel 22 then passes through the two relay lenses 23, is reflected by the cylinder mirror 24 and the concave mirror 25, and collected and imaged on the image generating surface of the DMD 12.

The image forming unit 10 will now be explained.

Figure 8:
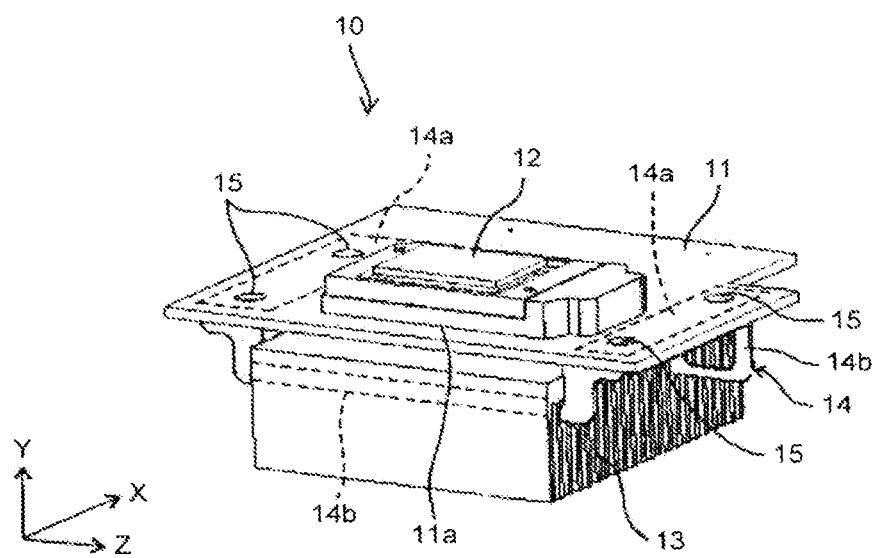
FIG. 8 is a perspective view of the image forming unit.

FIG. 8 is a perspective view of the image forming unit 10.

As illustrated in FIG. 8, the image forming unit 10 includes a DMD board 11 on which the DMD 12 is mounted. The DMD 12 is mounted on a socket 11a provided on the DMD board 11 so that an image forming surface on which micromirrors are arranged in a grid-like arrangement is faced upwardly. The DMD board 11 includes a driving circuit for driving the DMD mirrors. To the rear side of the DMD board 11 (the surface on the opposite side of the surface on which the socket 11a is provided), the heat sink 13 being a cooler for cooling the DMD 12 is fixed. A part of the DMD board 11 on which the DMD 12 is mounted has a penetrating hole. The heat sink 13 has a protrusion 13a (see FIG. 7) inserted into the penetrating hole not illustrated. The tip of the protrusion 13a is flat. By inserting the protrusion 13a into the penetrating hole not illustrated, the flat part located at the tip of the protrusion 13a abuts against the rear surface of the DMD 12 (the surface opposite of the image generating surface). An elastically deformable heat-transfer sheet may be pasted on the flat part or a part of the rear surface of the DMD 12 against which the heat sink 13 abuts, so that the adhesion between the flat part of the protrusion 13a and the rear surface of the DMD 12 increases, further to increase the heat conductivity.

The heat sink 13 is pressed against and fixed by a fixing member 14 to a surface of the DMD board 11 on the opposite side of a surface on which the socket 11a is provided. The fixing member 14 includes a plate-like fixing portion 14a that faces a right part of the rear surface of the DMD board 11 in FIG. 8, and another plate-like fixing portion 14a that faces a left part of the rear surface of the DMD board 11 in FIG. 8. A pressing portion 14b is provided near one end and the other end of each of the fixing portions in the X direction, in a manner connecting the right and the left fixing portions.

The heat sink 13 is pressed against and fixed by the fixing member 14 to the surface of the DMD board 11 on the opposite side of the surface where the socket 11a is provided, when the image forming unit 10 is fixed to the illumination bracket 26 (see FIG. 6) using screws.

Explained below is how the image forming unit 10 is fixed to the illumination bracket 26. To begin with, the image forming unit 10 is aligned with respect to the illumination bracket 26 so that the DMD 12 faces the illumination penetrating hole 26d provided on the bottom of the illumination bracket 26 in the illumination unit 20, as illustrated earlier in FIG. 5. A screw is then inserted into each penetrating hole not illustrated and provided on the fixing portions 14a, and into each of the penetrating holes 15 on the DMD board 11, from underneath in FIG. 8, and the screw is fastened with a threaded hole provided on the bottom of the screw fixing portion 262 (see FIG. 3) provided on the illumination bracket 26, so that the image forming unit 10 is fixed to the illumination bracket 26. As the screw is fastened with the screw fixing portion 262 provided on the illumination bracket 26, the pressing portion 14b is caused to press the heat sink 13 against the DMD board. In this manner, the heat sink 13 is pressed against and fixed to the surface of the DMD board 11 on the opposite side of the surface on which the socket 11a is provided, by the fixing member 14.

In this manner, the image forming unit 10 is fixed to the illumination bracket 26, and the three feet 29 illustrated in FIG. 5 which is mentioned earlier come to support the weight of the image forming unit 10 as well.

On the image generating surface of the DMD 12, a plurality of movable micromirrors are arranged in a grid-like arrangement. The mirror surface of each of the micromirrors can be tilted by a given angle about a rotational axis, so that two states of "ON" and "OFF" can be provided. While a micromirror is "ON", the micromirror reflects the light from the light source 61 toward the first optical system 70 (see FIG. 2), as illustrated in an arrow L2 in FIG. 7 which is mentioned earlier. When the micromirror is "OFF", the micromirror reflects the light from the light source 61 toward the OFF light plate 27 supported on the side of the illumination bracket 26 illustrated in FIG. 6 mentioned earlier (see an arrow L1 in FIG. 7). Therefore, by driving each of the mirrors independently, projection of light can be controlled for each pixel in image data, and, in this manner, an image can be generated.

The light reflected toward the OFF light plate 27 not illustrated is turned into heat and absorbed, and cooled by an external airflow.

The first optical unit 30 will now be explained.

Figure 9:
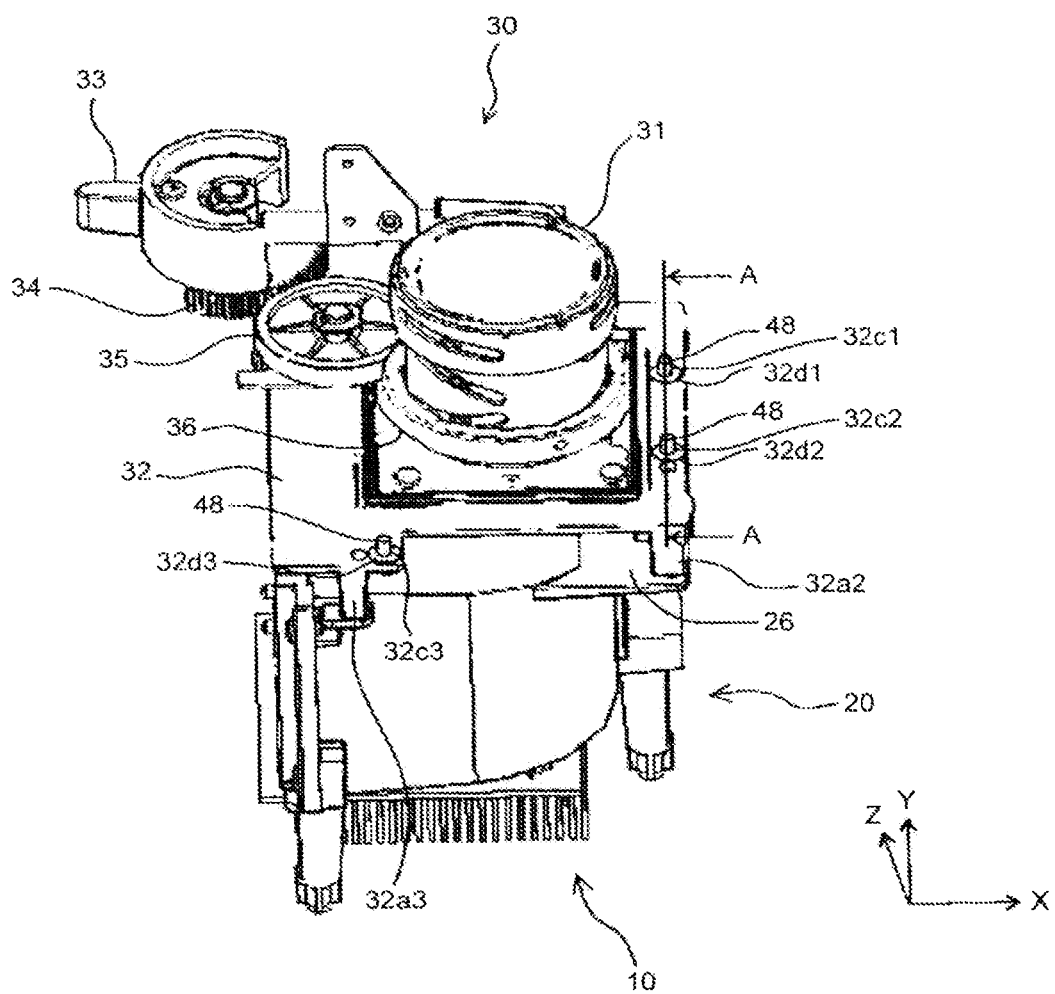
FIG. 9 is a perspective view illustrating a first optical unit, along with the illumination unit and the image forming unit.

FIG. 9 is a perspective view illustrating the first optical unit 30, along with the illumination unit 20 and the image forming unit 10.

As illustrated in FIG. 9, the first optical unit 30 is provided above the illumination unit 20, and includes the projection lens unit 31 holding the first optical system 70 (see FIG. 2) including a plurality of lenses, and the lens holder 32 for holding the projection lens unit 31. The lens holder 32 has four feet 32a1 to 32a4 extending downwardly (only the feet 32a2 and 32a3 are illustrated in FIG. 9; see FIG. 3 for the foot 32a1, and see FIG. 5 for the foot 32a4). Formed on the bottom of each of the feet 32a1 to 32a4 is a threaded hole to be fixed to the illumination bracket 26 with a screw.

The projection lens unit 31 also includes a focus gear 36. An idler gear 35 meshes with the focus gear 36. A lever gear 34 meshes with the idler gear 35, and the focus lever 33 is fixed to the rotating shaft of the lever gear 34. The tip of the focus lever 33 is exposed from the main apparatus illustrated in FIG. 1 mentioned earlier.

When the focus lever 33 is moved, the focus gear 36 is rotated via the lever gear 34 and the idler gear 35. When the focus gear 36 is rotated, the lenses included in the first optical system 70 in the projection lens unit 31 are moved in predetermined directions, respectively, to enable the focus of the projected image to be adjusted.

The lens holder 32 has four screw penetrating holes 32c1 to 32c3 each of which a screw 48 for fixing the second optical unit 40 to the first optical unit 30 is passed through (in FIG. 9, only the three screw penetrating holes are illustrated, and the screw 48 is passed through each of the screw penetrating holes 32c1 to 32c3. The tip of the threaded part of each of the screws 48 is visible). Provided around each of the screw penetrating holes 32c1 to 32c3 is a corresponding second optical unit aligning protrusion 32d1 to 32d3 protruding from a surface of the lens holder 32 (32d1 to 32d3 are illustrated in FIG. 9).

Figure 10:
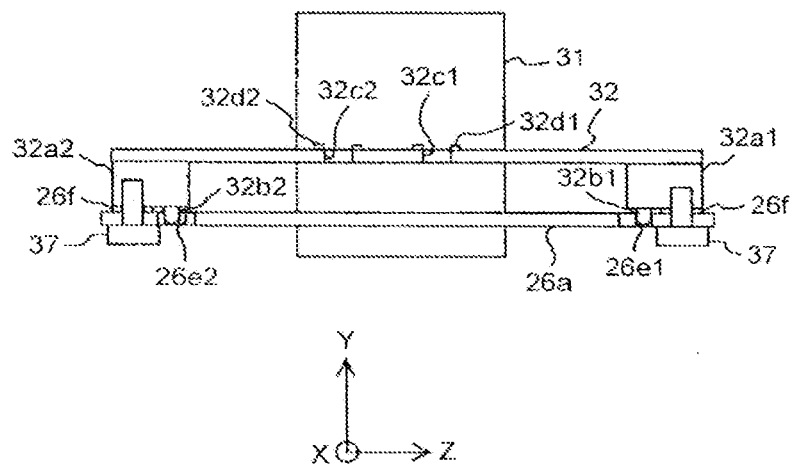
FIG. 10 is a cross-sectional view across A-A in FIG. 9.

FIG. 10 is a cross-sectional view across A-A illustrated in FIG. 9.

As illustrated in FIG. 10, the feet 32a1, 32a2 have protrusions-to-be-aligned 32b1, 32b2, respectively. The protrusion-to-be-aligned 32b1 on the right side in FIG. 10 is passed through the aligning hole 26e1 in a shape of a circular hole provided on the top surface 26b of the illumination bracket 26 being the main reference for the alignment. The protrusion-to-be-aligned 32b2 on the left side in FIG. 10 is passed through the aligning hole 26e2 in a shape of a long hole and being the sub-reference for the alignment. In this manner, the first optical unit 30 is aligned with respect to the illumination unit 20 in the Z axis direction and the X axis direction. A screw 37 is inserted into each of the penetrating holes 26c1 to 26c4 provided on the top surface 26b of the illumination bracket 26, and fastened to the threaded hole provided on each of the feet 32a1 to 32a4 of the lens holder 32. In this manner, the first optical unit 30 is aligned and fixed to the illumination unit 20.

The part of the projection lens unit 31 located above the lens holder 32 is covered by a mirror holder 45 included in the second optical unit, which will be described later (see FIG. 12). As illustrated in FIG. 3 mentioned earlier, the part of the projection lens unit 31 below the lens holder 32, that is a part between the lens holder 32 and the top surface 26b of the illumination bracket 26 in the illumination unit 20 is exposed, but because the projection lens unit 31 is engaged with the lens holder 32, no light enters the optical path of the image from the part exposed.

The second optical unit 40 will now be explained.

Figure 11:
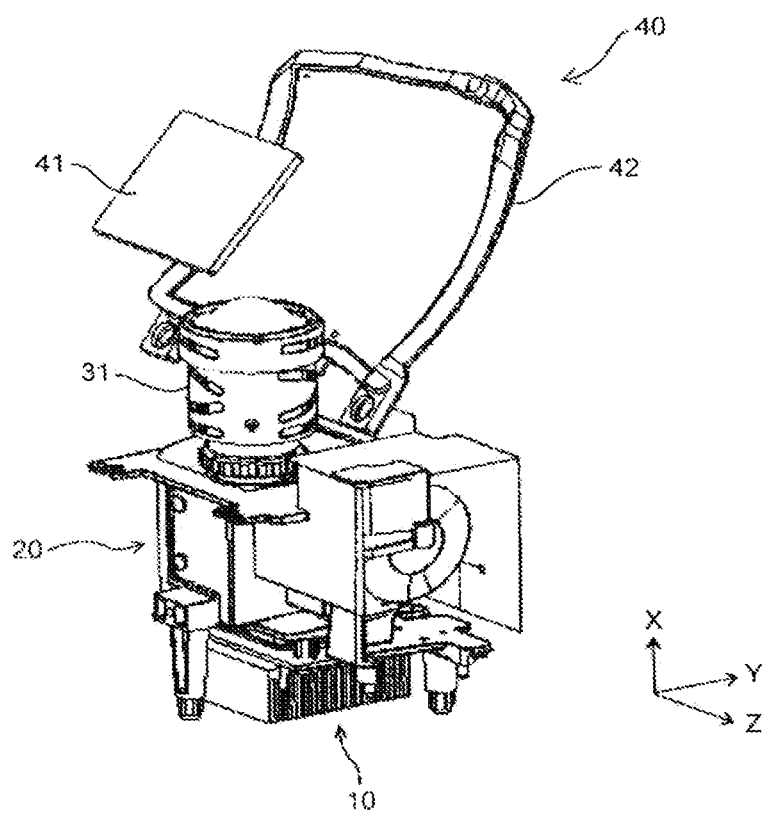
FIG. 11 is a perspective view illustrating a second optical system supported by a second optical unit, along with the projection lens unit, the illumination unit, and the image forming unit.

FIG. 11 is a perspective view illustrating a second optical system included in the second optical unit 40, along with the projection lens unit 31, the illumination unit 20, and the image forming unit 10.

As illustrated in FIG. 11, the second optical unit 40 includes the folding mirror 41 and the curved mirror 42 having a shape of a concave, and these two make up the second optical system. The light-reflecting surface of the curved mirror 42 may be a spherical surface, a rotationally symmetric aspheric surface, or a free-form surface.

Figure 12:
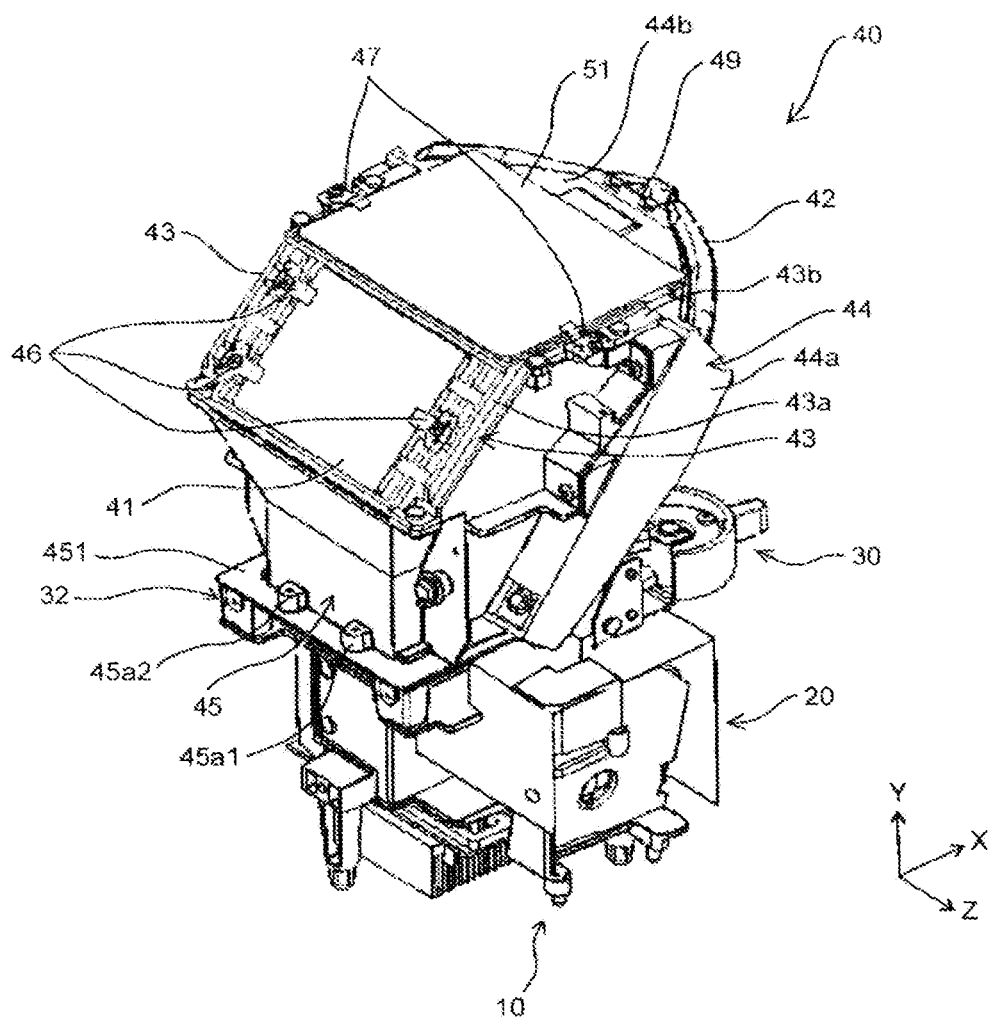
FIG. 12 is a perspective view illustrating the second optical unit, along with the first optical unit, the illumination unit, and the image forming unit.

FIG. 12 is a perspective view illustrating the second optical unit 40, along with the first optical unit 30, the illumination unit 20, and the image forming unit 10.

As illustrated in FIG. 12, the second optical unit 40 also includes the transmissive glass 51 that passes through the light image reflected on the curved mirror 42, and protects the optical system components inside of the apparatus from dusts.

The second optical unit 40 includes a mirror bracket 43 for holding the folding mirror 41 and the transmissive glass 51, a free mirror bracket 44 for holding the curved mirror 42, and the mirror holder 45 on which the mirror bracket 43 and the free mirror bracket 44 are mounted.

The mirror holder 45 has a shape of a box that opens to the top, to the bottom, and to the rear in the X direction in FIG. 12, and has a general U shape when viewed from the top. An edge extending on each of the front side and the rear side of the top opening of the mirror holder 45 in the Z direction and extending the X direction includes a inclined part inclined having a height increasing from the front side in the X direction toward the rear side in the X direction in FIG. 12, and a parallel part extending in parallel with the X direction in FIG. 12. The inclined part is provided on the front side of the parallel part in the X direction in FIG. 12. An edge of the top opening of the mirror holder 45 located on the front side in the X direction in FIG. 12 and extending along the Z direction is in parallel with the Z direction in FIG. 12.

The mirror bracket 43 is mounted on the upper part of the mirror holder 45. The mirror bracket 43 includes an inclined surface 43a that is inclined in the manner rising from a front edge abutting against the inclined part of the edge of the top opening of the mirror holder 45 toward the rear side in the X direction in FIG. 12, and a parallel surface 43b abutting against the parallel part of the edge of the top opening of the mirror holder 45 and extending in parallel with the X direction. Each of the inclined surface 43a and the parallel surface 43b has an opening. The mirror bracket 43 holds the folding mirror 41 whereby closing the opening on the inclined surface 43a, and holds the transmissive glass 51 whereby closing the opening on the parallel surface 43b.

Both of the Z-direction ends of the folding mirror 41 are pressed against the inclined surface 43a by mirror pressing members 46 each functioning like a plate spring. In this manner, the folding mirror 41 is aligned and fixed to the inclined surface 43a of the mirror bracket 43. One of the Z-direction side ends of the folding mirror 41 is fixed with two of the mirror pressing members 46, and the other side end is fixed with the mirror pressing member 46 in singularity.

Both of the Z-direction ends of the transmissive glass 51 are pressed against the parallel surface 43b of the mirror bracket 43 by glass pressing members 47 each functioning like a plate spring. In this manner, the transmissive glass 51 is aligned and fixed to the mirror bracket 43. Each of the Z-direction ends of the transmissive glass 51 is held by the glass pressing member 47 in singularity.

The free mirror bracket 44 for holding the curved mirror 42 includes arms 44a on the front side and the rear side in the Z axis direction. Each of the arms is inclined in a manner coming down from the rear side toward the front side in the X direction in FIG. 12. The free mirror bracket 44 also has a connector 44b for connecting these two arms across the upper parts of the arms 44a. The arms 44a of the free mirror bracket 44 are attached to the mirror holder 45 so that the opening on the rear side of the mirror holder 45 in the X direction in FIG. 12 is covered by the curved mirror 42.

An approximate center of the curved mirror 42 on the side of the transmissive glass 51 is pressed against the connector 44b of the free mirror bracket 44 by a free mirror pressing member 49 functioning like a plate spring. Both ends of the curved mirror 42 on the side of the first optical system in the Z axis direction in FIG. 12 are respectively fixed to the arms 44a of the free mirror bracket 44 with screws.

The second optical unit 40 is provided on top of the lens holder 32 of the first optical unit 30, and fixed to the lens holder 32. Specifically, provided on the lower part of the mirror holder 45 is bottom surface 451 that faces the top surface of the lens holder 32, and the bottom surface 451 is provided with four threaded receptacles 45a1 to 45a3 each of which has a tubular shape and fixed to the first optical unit 30 with screws (for the threaded receptacles 45a1, 45a2, see FIG. 11; see FIG. 5 for the threaded receptacle 45a3; the remaining threaded receptacle is not illustrated). A screw 48 is passed through each of the screw penetrating holes 32c1 to 32c3 provided on the lens holder 32 in the first optical unit 30, and fastened to corresponding one of the threaded receptacles 45a1 to 45a3. In this manner, the second optical unit 40 is fixed to the first optical unit 30 with screws. At this time, the bottom surface of the mirror holder 45 in the second optical unit 40 abuts against the second optical unit aligning protrusions 32d1 to 32d4 on the lens holder 32. In this manner, the second optical unit 40 is aligned and fixed in the Y direction.

When the second optical unit 40 is provided on top of and fixed to the lens holder 32 of the first optical unit 30, the part of the projection lens unit 31 located above the lens holder 32 is housed in the mirror holder 45 in the second optical unit 40, as illustrated in FIG. 9 in a manner mentioned earlier. Furthermore, when the second optical unit 40 is provided on top of and fixed to the lens holder 32, a gap is formed between the curved mirror 42 and the lens holder 32, and the idler gear 35 is inserted into the gap (see FIG. 9).

Figure 13:
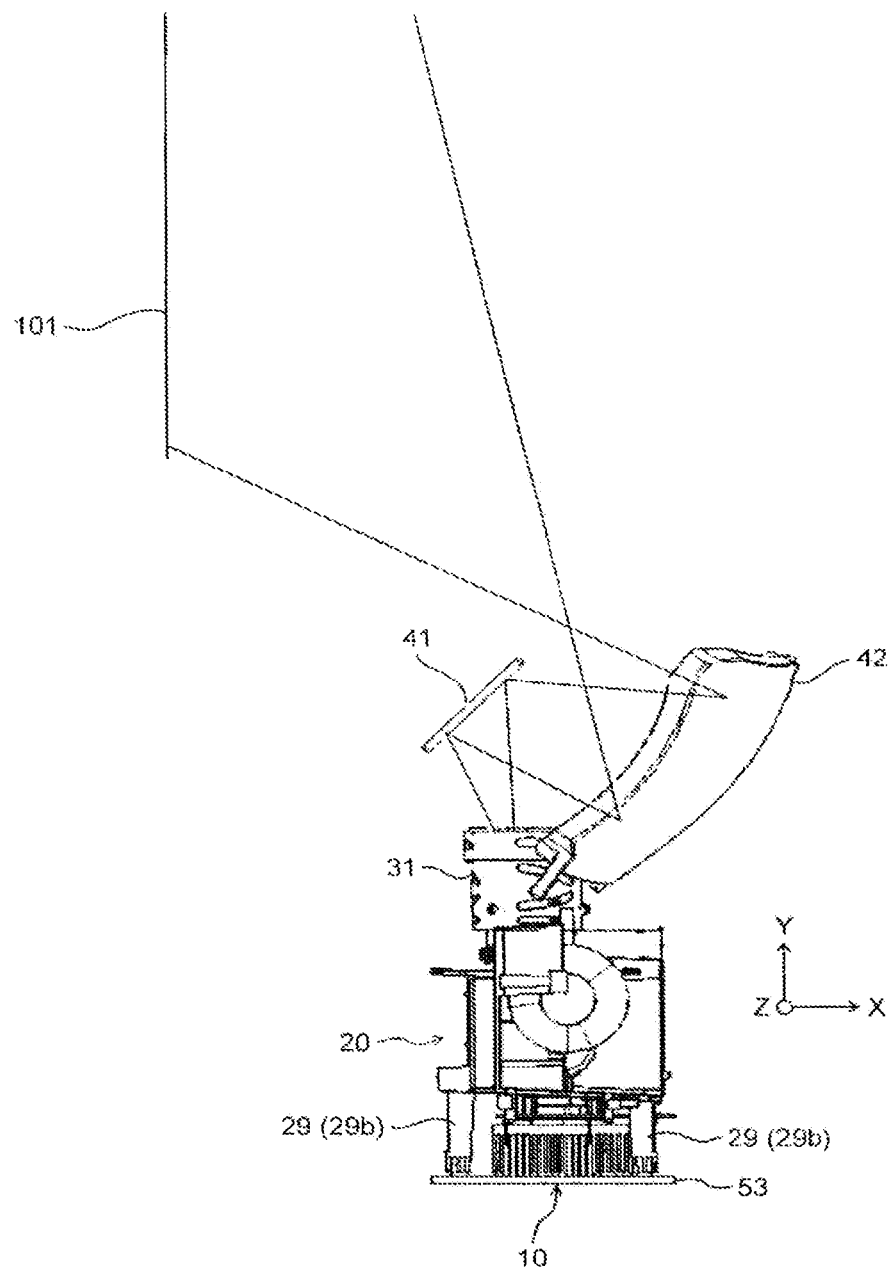
FIG. 13 is a perspective view illustrating an optical path from the first optical system to the projection surface.

FIG. 13 is a perspective view illustrating an optical path from the first optical system 70 to the projection surface 101 (screen).

A light beam passed through the projection lens unit 31 included in the first optical system 70 forms an intermediate image that is in a conjugate relation with the image generated by the DMD 12 between the folding mirror 41 and the curved mirror 42. The intermediate image is imaged as a curved-surface image between the folding mirror 41 and the curved mirror 42. The light image then becomes incident on the concaved curved mirror 42. The intermediate image is then converted into a "further enlarged image" by the curved mirror 42, and projected and imaged on the projection surface 101.

In the manner described above, because the projecting optical system includes the first optical system 70 and the second optical system, and the intermediate image is formed between the first optical system 70 and the curved mirror 42 in the second optical system, and enlarged and projected by the curved mirror 42, the projection distance can be reduced, and the projector can be used in a small meeting room or the like.

Furthermore, the first optical unit 30 and the second optical unit 40 are provided on top of and fixed to the illumination bracket 26, as illustrated in FIG. 13, and the image forming unit 10 is fixed to the illumination bracket 26. Therefore, these units are fixed to the base member 53 while the feet 29 on the illumination bracket 26 support the weight of the first optical unit 30, the second optical unit 40, and the image forming unit 10.

Figure 14:
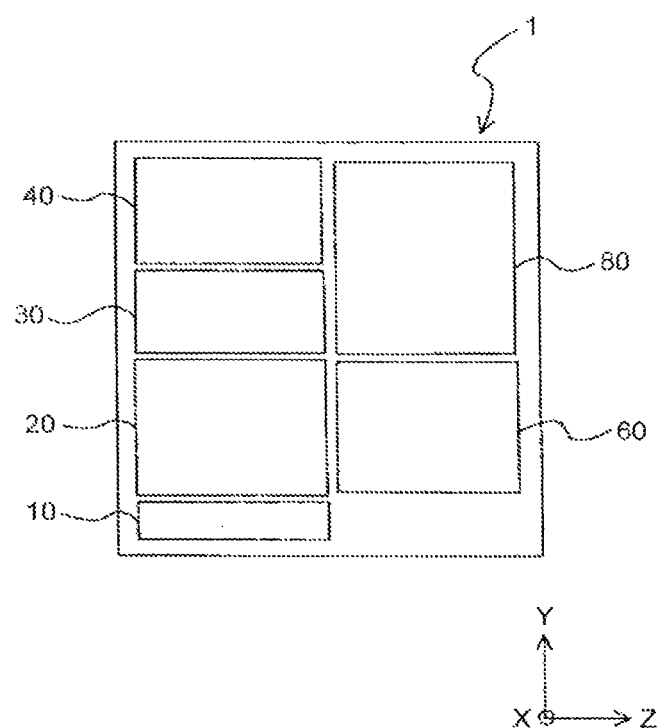
FIG. 14 is a schematic illustrating a positional relation of the units included in the apparatus.

FIG. 14 is a schematic illustrating a positional relation between each of the units in the apparatus.

As illustrated in FIG. 14, the image forming unit 10, the illumination unit 20, the first optical unit 30, and the second optical unit 40 are provided on top of each other in the Y direction that is the short axis direction of the projection surface, and the light source unit 60 is provided in the Z direction that is the long axis direction of the projection surface with respect to the image forming unit 10, the illumination unit 20, the first optical unit 30, and the second optical unit 40 provided on top of each other. In this manner, according to the embodiment, the image forming unit 10, the illumination unit 20, the first optical unit 30, the second optical unit 40, and the light source unit are arranged along the Y direction or the Z direction that are directions in parallel with the projected image and the projection surface 101. More specifically, the light source unit 60 is connected to the image forming unit A in a direction perpendicular to a direction in which the projecting optical system B, including the first optical unit 30 and the second optical unit 40, is provided on top of the image forming unit A, including the image forming unit 10 and the illumination unit 20. Furthermore, the image forming unit A and the light source unit 60 are arranged along the same line that is in parallel with the base member 53. Furthermore, the image forming unit A and the projecting optical system B are arranged along the same line that is perpendicular to the base member 53, in an order of the image forming unit A and the projecting optical system B, from the side of the base member 53.

Furthermore, in the embodiment, the light source 61 and the power unit 80 for supplying power to the DMD 12 are provided above the light source unit 60. The light source unit 60, the power unit 80, the image forming unit A, and the projecting optical system B are enclosed by an enclosure of the projector 1 that is to be described later and includes the top surface of the projector mentioned above, the base member 53, and an outer cover 59 surrounding the projector 1 (see FIG. 18).

Figure 15:
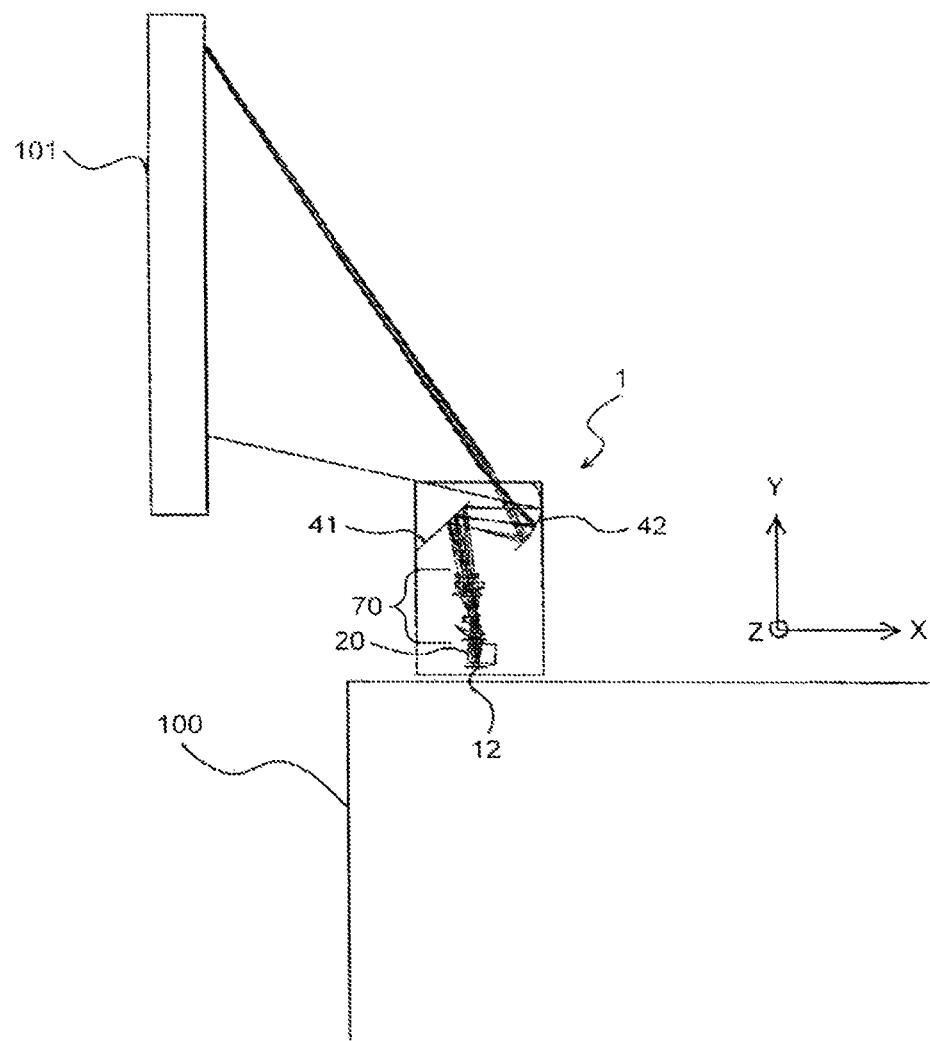
FIG. 15 is a schematic of an example illustrating how the projector according to the embodiment is used.
Figure 16:
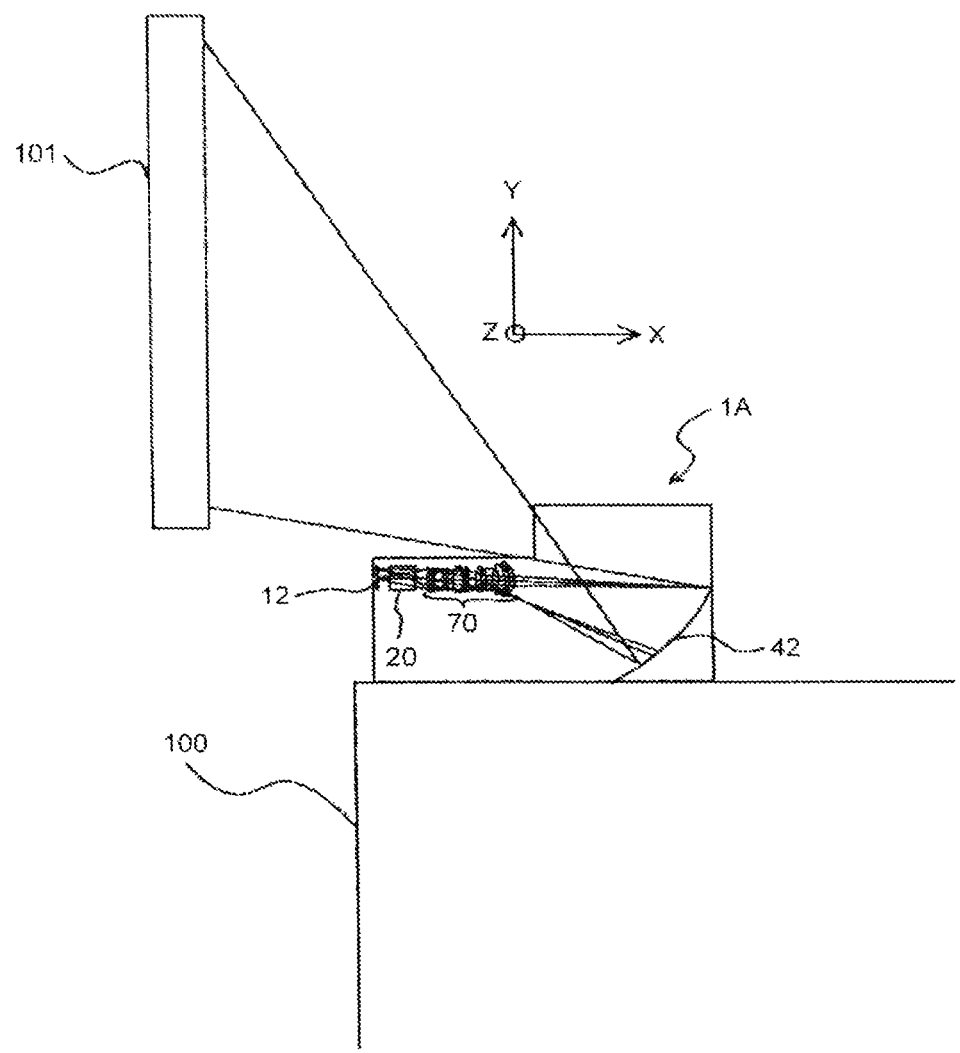
FIG. 16 is a schematic of an example illustrating how a conventional projector is used.
Figure 17:
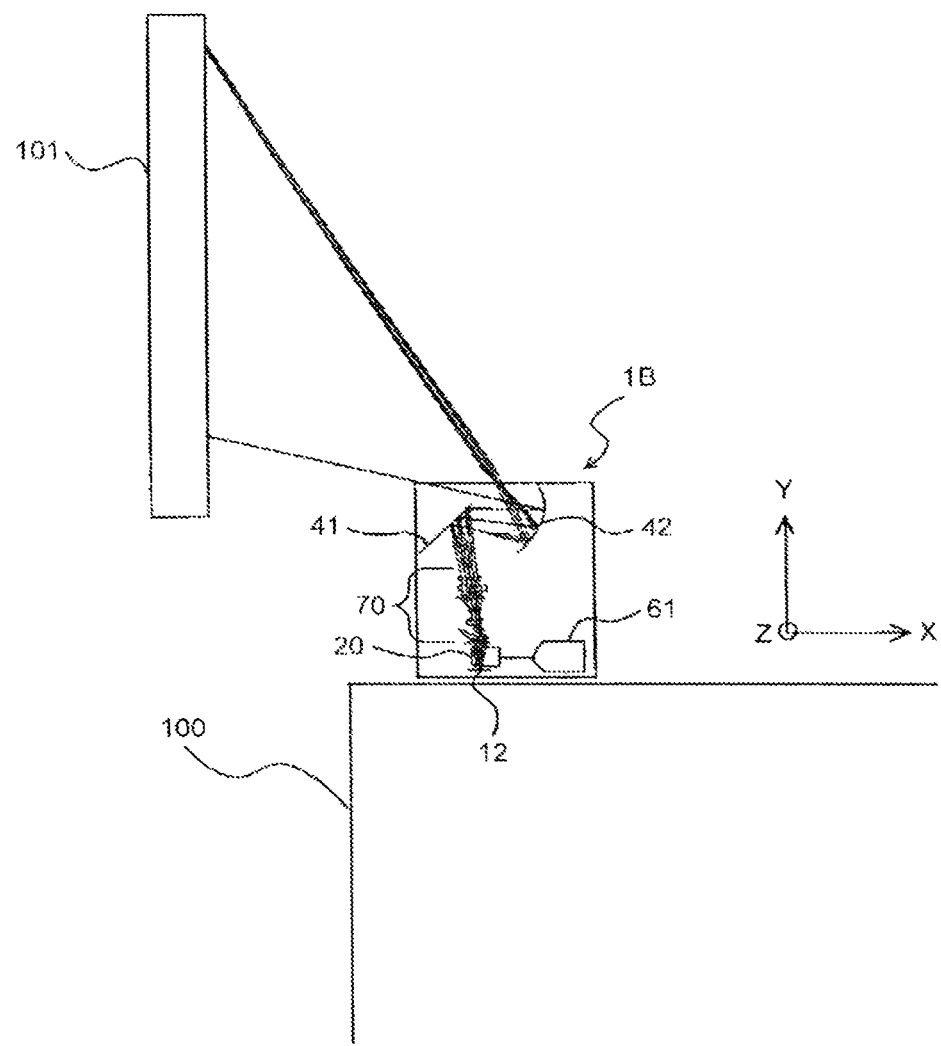
FIG. 17 is a schematic of an example illustrating how a projector, including the light source and the illumination unit provided in a direction perpendicular to the projection surface, is used.

FIG. 15 is a schematic of an example illustrating how the projector 1 according to the embodiment is used. FIG. 16 is a schematic of an example illustrating how a conventional projector 1A is used. FIG. 17 is a schematic of an example illustrating how a projector 1B including the light source 61 and the illumination unit 20 provided in a direction perpendicular to the projection surface 101 is used.

As illustrated in FIGS. 15 to 17, when the projector 1 is to be used in a meeting room for example, the projector 1 is used in a manner placed on a table 100, projecting an image on the projection surface 101 such as a whiteboard.

As illustrated in FIG. 16, in the conventional projector 1A, the DMD 12 (image generating element), the illumination unit 20, the first optical system 70, and the second optical system (the curved mirror 42) are arranged serially in line with each other, along a direction perpendicular to the surface of the projected image projected on the projection surface 101. Therefore, the projector 1A is extended in the direction perpendicular to the projection surface 101 (in the X direction), and the projector 1A takes up a space in the direction perpendicular to the projection surface 101. Because chairs and a table used by audience viewing the projected image P projected on the projection surface 101 are generally arranged in the direction perpendicular to the projection surface 101; so that if the projector 1 takes up a space in the direction perpendicular to the projection surface 101, a space for placing chairs and a table is limited by that amount, and becomes inconvenient.

In the projector 1B illustrated in FIG. 17, the DMD 12 (image forming element), the illumination unit 20, and the first optical system 70 are arranged serially, in a direction parallel with the plane of the projected image P projected on the projection surface 101. Therefore, the length in the direction perpendicular to the projection surface 101 can be reduced, compared with the projector 1A illustrated in FIG. 16. However, in the projector 1B illustrated in FIG. 17, the light source 61 is arranged in the direction perpendicular to the plane of the projected image with respect to the illumination unit 20. Therefore, the length of the projector in the direction perpendicular to the projection surface 101 cannot be reduced sufficiently.

By contrast, in the projector 1 according to the embodiment illustrated in FIG. 15, the image forming unit A including the image forming unit 10 and the illumination unit 20 and the projecting optical system B including the first optical unit 30 and the folding mirror 41 are arranged serially in the Y direction in FIG. 15, among the directions in parallel with the projection surface 101 and the image plane of the projected image projected on the projection surface 101. Furthermore, the light source unit 60 and the illumination unit 20 are arranged serially in the Z direction in FIG. 15, among the directions in parallel with the plane of the projected image projected on the projection surface 101. In other words, the projector 1 according to the embodiment has a structure in which the light source unit 60, the image forming unit 10, the illumination unit 20, the first optical unit 30, and the folding mirror 41 are arranged in directions in parallel with the plane of the projected image projected on the projection surface 101 (the Z direction or the Y direction in FIG. 15), and the light source unit 60, the image forming unit 10, the illumination unit 20, the first optical unit 30, and the folding mirror 41 are arranged in a manner intersecting with a plane that is in parallel with the projection surface and the image plane of projected image. Because the light source unit 60, the image forming unit 10, the illumination unit 20, the first optical unit 30, and the folding mirror 41 are arranged in the directions in parallel with the plane of the projected image projected on the projection surface 101 (the Z direction or the Y direction in FIG. 15), the length in the direction perpendicular to the projection surface 101 (in the X direction in FIG. 15) can be reduced, as illustrated in FIG. 15, compared with the projectors illustrated in FIGS. 16 and 17. In this manner, the projector 1 can be suppressed from taking up a space for chairs and tables, and the convenient projector 1 can be provided.

Furthermore, in the embodiment, the light source 61 and the power unit 80 for supplying power to the DMD 12 are provided above the light source unit 60, as illustrated in FIG. 14 explained earlier. In this manner, the Z direction of the projector 1 is also reduced.

Figure 18:
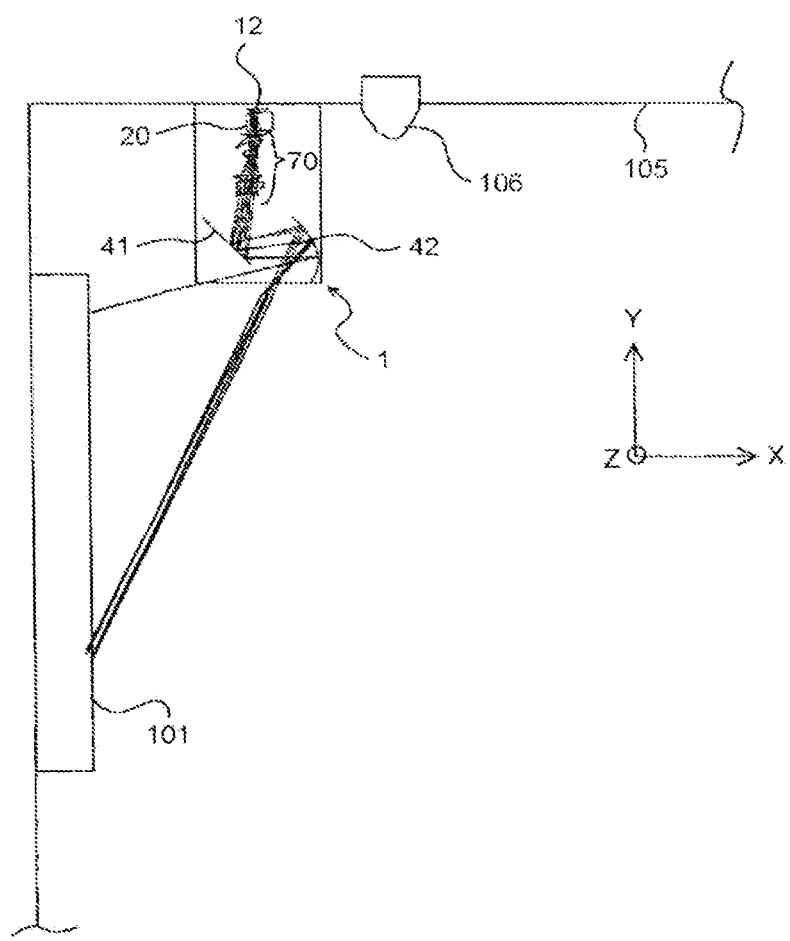
FIG. 18 is a schematic of another example illustrating how the projector according to the embodiment is used.

FIG. 18 is a schematic of another example illustrating how the projector 1 according to the embodiment is used.

As illustrated in FIG. 18, the projector 1 according to the embodiment may also be used in a manner hanging on a ceiling 105. In such a case as well, because the projector 1 according to the embodiment is short in the direction perpendicular to the projection surface 101, the projector 1 can be installed on the ceiling 105 without interrupting a luminaire 106 provided on the ceiling 105.

In the embodiment, the second optical system includes the folding mirror 41 and the curved mirror 42. However, the second optical system may only have the curved mirror 42. Furthermore, the folding mirror 41 may be a plane mirror, a mirror with a positive refractive power, or a mirror with a negative refractive power. Furthermore, in the embodiment, a concave mirror is used for the curved mirror 42, but a convex mirror may be used instead. In such a case, the first optical system 70 is configured so that no intermediate image is formed between the first optical system 70 and the curved mirror 42.

The light source 61 needs to be replaced regularly because the light source reaches a lifetime due to aging. Therefore, in the embodiment, the light source unit 60 is provided removable from apparatus main unit.

FIG. 18 is a perspective view of the projector 1 viewed from a setting surface.

As illustrated in FIG. 18, the base member 53 functioning as the bottom surface of the projector 1 is provided with the removable cover 54, and the removable cover 54 has a rotational knob 54a. When the rotational knob 54a is rotated, the removable cover 54 and apparatus main unit are disengaged, so that the removable cover 54 can be removed from the apparatus main unit. The base member 53 also has a power supply air inlet 56 at a position adjacent to the removable cover 54 in the X direction.

Provided on one Y-X plane of the outer cover 59 of the projector 1 is an air inlet 84 and an external input unit 88 for receiving image data or the like from an external apparatus such as a personal computer, as illustrated in FIG. 18.

Figure 19:
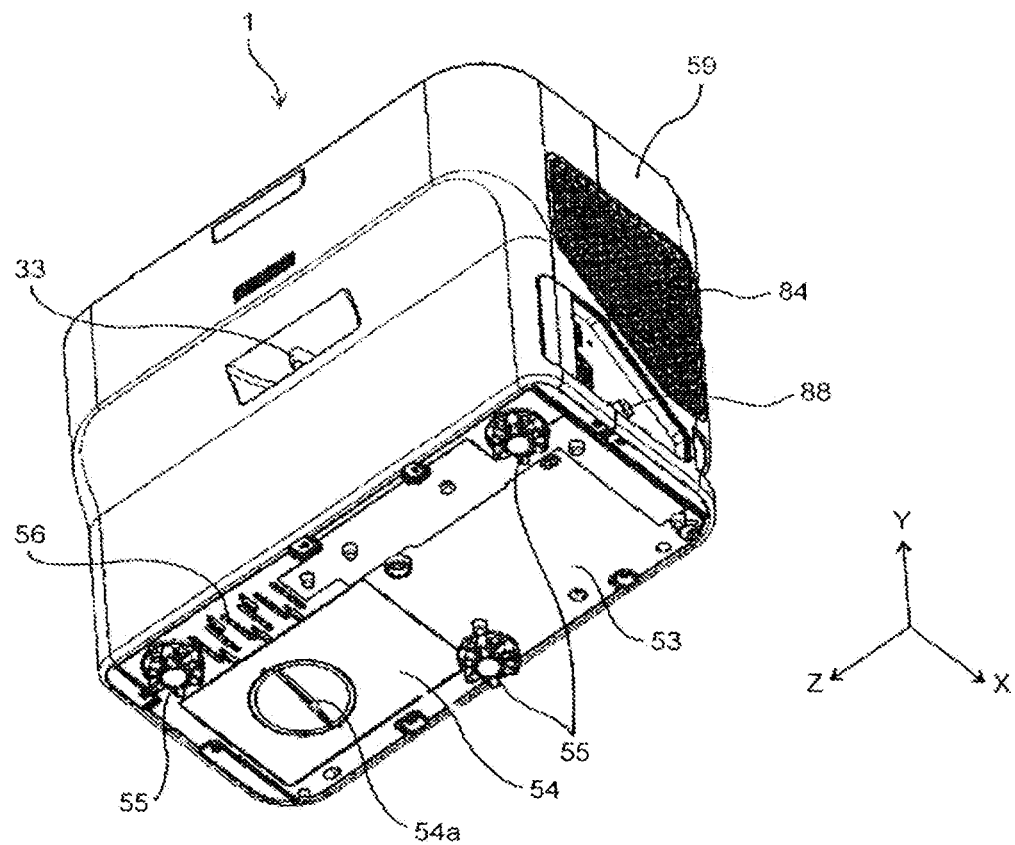
FIG. 19 is a perspective view of the projector viewed from the side of an installation surface.

FIG. 19 is a perspective view illustrating the apparatus with the removable cover 54 removed.

When the removable cover 54 is removed, a surface of the light source bracket 62 in the light source unit 60 on the opposite side of the surface on which the light source 61 is mounted is exposed, as illustrated in FIG. 19. The light source bracket 62 includes a handle 66 that is rotatable with respect to the light source bracket 62 about a rotating axis at a line O1 illustrated in a dotted line in FIG. 19.

When the light source unit 60 is to be removed from the apparatus main unit, the handle 66 is rotated, and the light source unit 60 is pulled out toward the front side in FIG. 19, by grabbing the handle 66. In this manner, the light source unit 60 is removed through the opening on the apparatus main unit. When the light source unit 60 is to be mounted on the apparatus main unit, the light source unit 60 is inserted into the opening on the apparatus main unit. As the light source unit 60 is inserted into the apparatus main unit, the connector 62*a* illustrated in FIG. 4 explained earlier becomes connected with the power-supply side connector not illustrated on the apparatus main unit, and the three light source aligning portions 64*a*1 to 64*a*3 on the holder 64 illustrated in FIG. 4 become engaged with the respective three light source portions-to-be-aligned 26*a*1 to 26*a*3 provided on the illumination bracket 26 in the illumination unit 20 illustrated in FIG. 6 mentioned above, and the light source unit 60 becomes aligned with respect to the apparatus main unit. In this manner, mounting of the light source unit 60 is completed. The removable cover 54 is then attached to the base member 53. In the embodiment, the light source unit 60 includes the handle 66, but the passage 65 provided in a manner protruding toward the removable cover 54, as illustrated in FIG. 19, may be used as a handle.

The base member 53 includes three feet 55 provided thereto. By rotating each of the feet 55, the amount by which the foot 55 protrudes from the base member 53 can be changed, to enable the height direction (the Y direction) to be adjusted.

On the other Y-X plane of the outer cover 59, an air outlet 85 is provided, as illustrated in FIG. 19.

Figure 20:
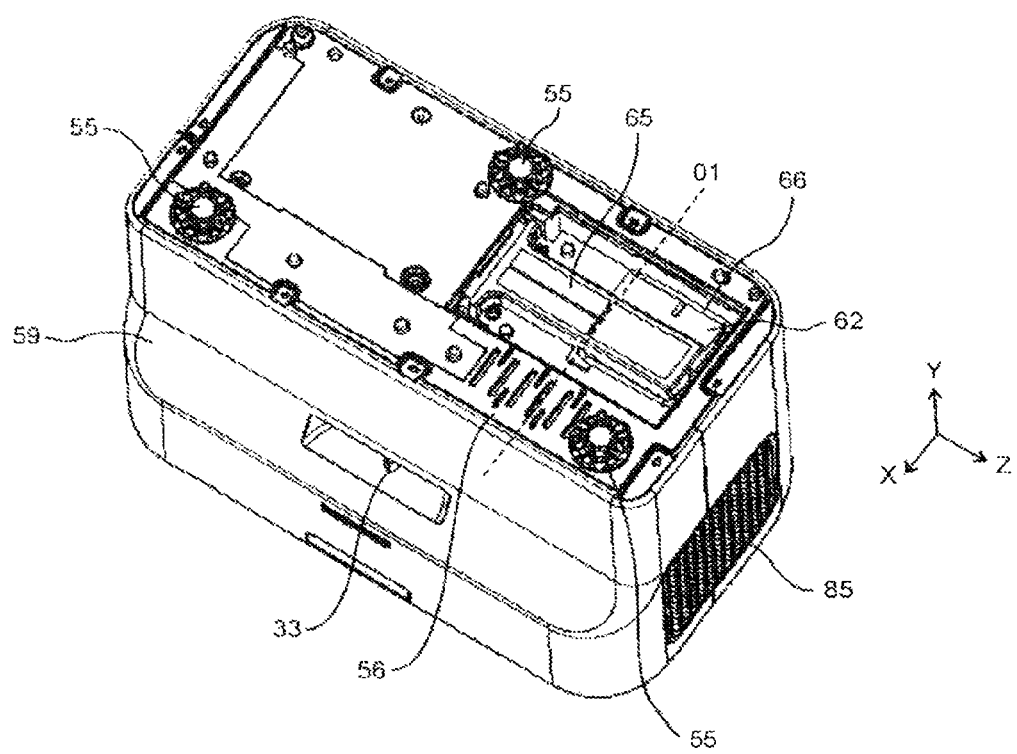
FIG. 20 is a perspective view illustrating the apparatus with a removable cover 54 removed.
Figure 21:
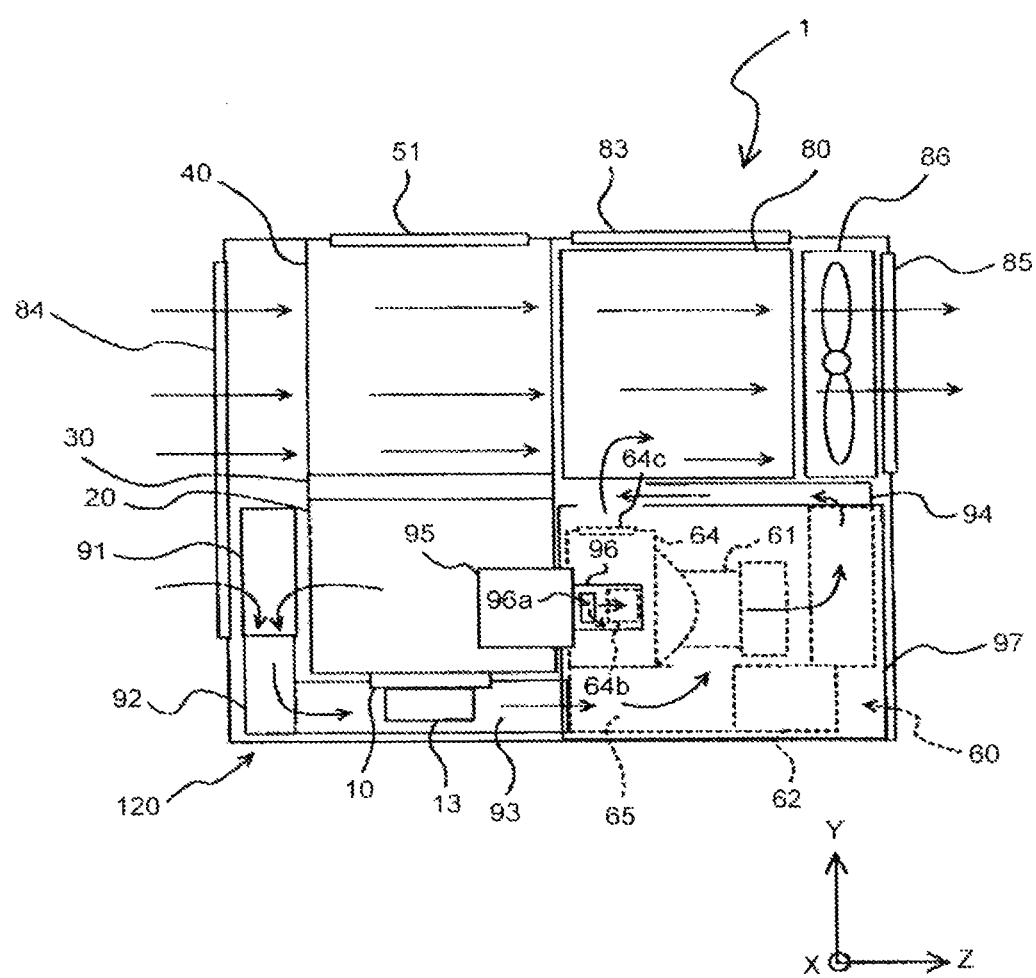
FIG. 21 is a schematic for explaining how the air flows inside of the projector according to the embodiment.

FIG. 21 is a schematic for explaining how the air flows inside of the projector 1 according to the embodiment. FIG. 20 is a schematic of the projector 1 viewed from a direction perpendicular to the projection surface 101 (from the X direction).

Figure 27:
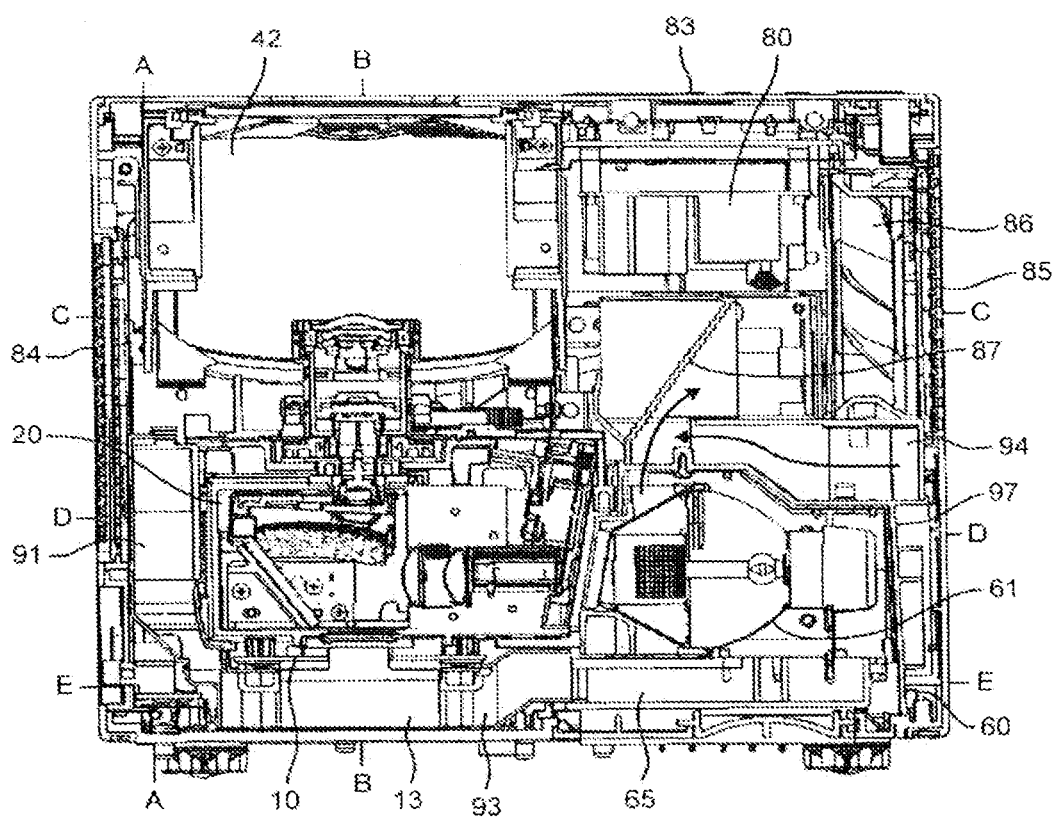
FIG. 27 is a schematic more specifically illustrating the structures illustrated in FIG. 21.
Figure 28:
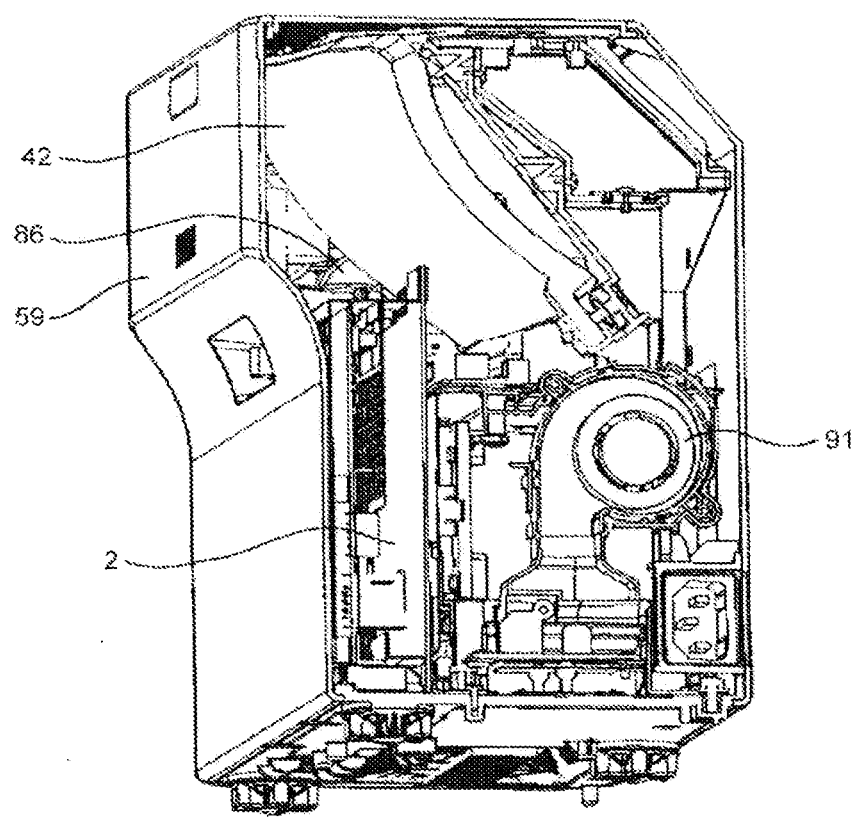
FIG. 28 is a cross-sectional view across A-A in FIG. 27.
Figure 29:
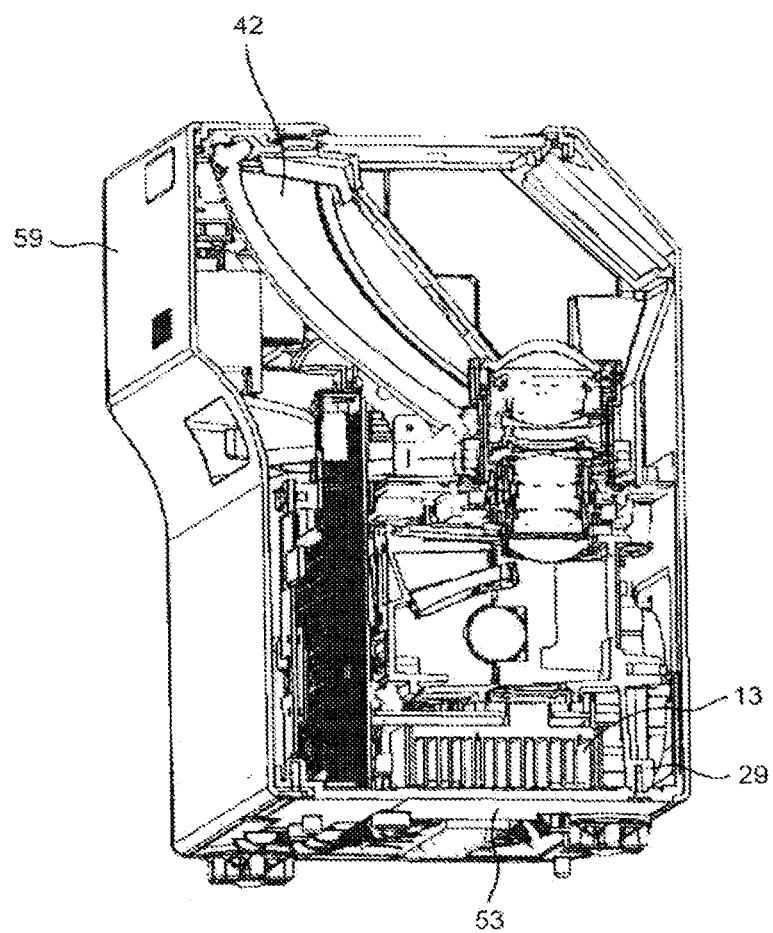
FIG. 29 is a cross-sectional view across B-B in FIG. 27.
Figure 30:
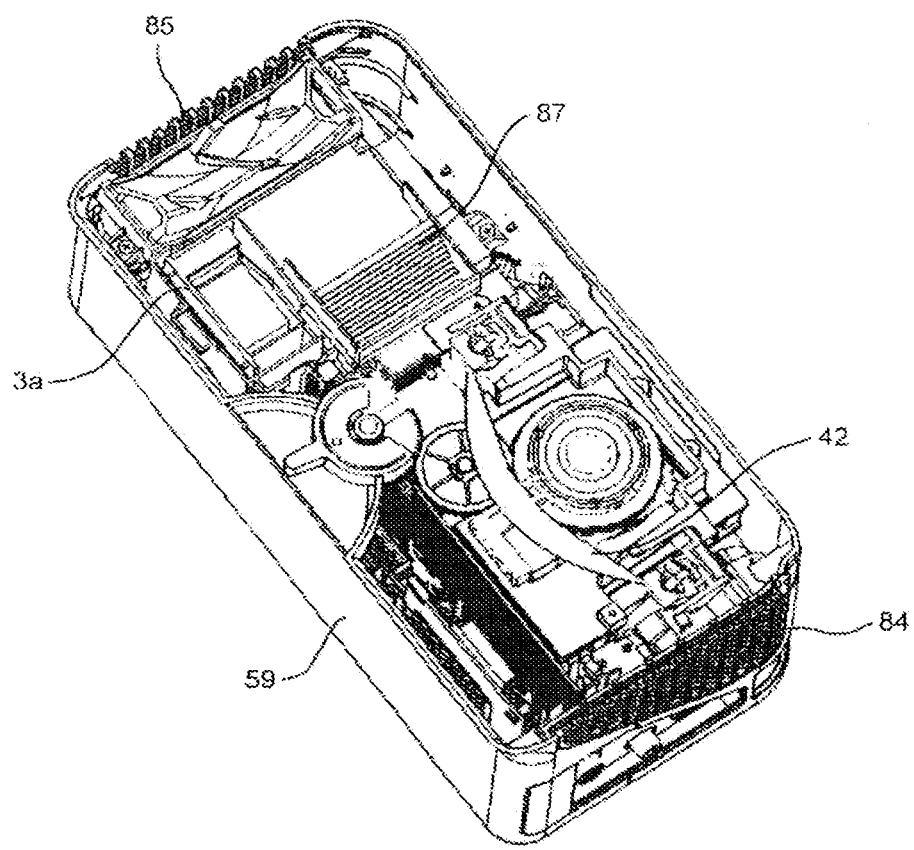
FIG. 30 is a cross-sectional view across C-C in FIG. 27.
Figure 31:
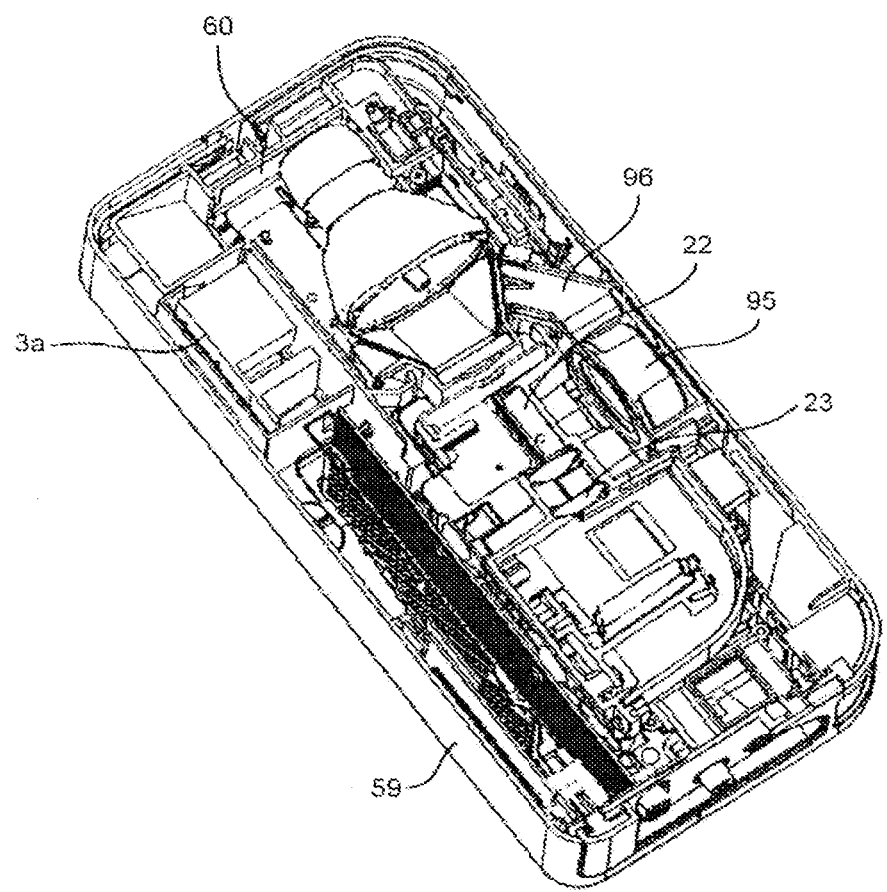
FIG. 31 is a cross-sectional view across D-D in FIG. 27.
Figure 32:
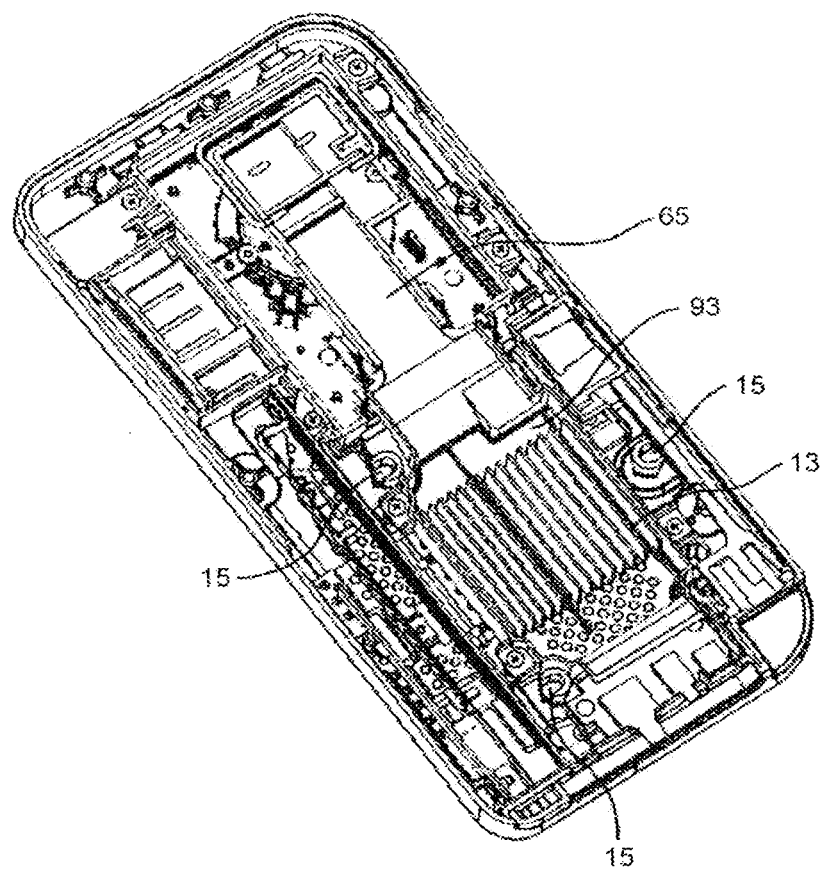
FIG. 32 is a cross-sectional view across E-E in FIG. 27.

In FIG. 27, elements corresponding to those in FIG. 21 in the embodiment are assigned with the corresponding numbers. The arrows illustrated in FIGS. 21 and 27 indicate directions of airflows. FIG. 28 is a cross-sectional view across A-A in FIG. 27. FIG. 29 is a cross-sectional view across B-B in FIG. 27. FIG. 30 is a cross-sectional view across C-C in FIG. 27. FIG. 31 is a cross-sectional view across D-D in FIG. 27. FIG. 32 is a cross-sectional view across E-E in FIG. 27.

As illustrated in FIG. 20, provided on one side surface of the projector 1 (on the left side in FIG. 20) is the air inlet 84 opened so that the external air can be collected into the projector 1. Provided on the other side surface of the projector 1 (on the right side in FIG. 20) is the air outlet 85 opened so as to allow the air inside of the projector 1 to be discharged. A discharge fan 86 is provided facing the air outlet 85.

In the manner described above, because the air outlet 85 and the air inlet 84 are arranged so that some part of the air outlet 85 and the air inlet 84 comes between the light source unit 60 and the operating unit 83, viewing the projector 1 from the direction perpendicular to the projection surface 101 (the X direction), an air flow passing between the light source unit 60 and the operating unit 83 and discharged through the air outlet 85 can be generated. Furthermore, as explained earlier, the air suctioned through the air inlet 84 passes along the rear surface of the curved mirror 42 and reaches the air outlet 85 (see FIG. 30). As explained earlier, the curved mirror 42 is a concave mirror with a positive power, and the rear surface of the curved mirror 42 has a convex form generally following the form of the front surface. The power unit 80 provided above the light source unit 60 has a general rectangular U shape not having a side only on the side of the light source unit 60, viewing from the Z direction in FIG. 20. The external air collected through the air inlet 84 and moving toward the air inlet 85 following the mirror holder 45 or the curved rear surface of the curved mirror 42 flows into a space having three sides out of four sides surrounded by the power unit 80, excluding the side on the side of the light source unit 60, and is discharged through the air outlet 85.

In the manner described above, because the air outlet 85 and the air inlet 84 are arranged so that some part of the air outlet 85 and the air inlet 84 comes between the light source unit 60 and the operating unit 83, viewing the projector 1 from the direction perpendicular to the projection surface 101 (the X direction), an air flow passing between the light source unit 60 and the operating unit 83 and discharged through the air outlet 85 can be generated.

A light source blower 95 is disposed at a position allowing the air to be suctioned around the color motor 21*a* driving the color wheel 21 in the illumination unit 20 (see FIG. 5) in rotation. In this manner, the color motor 21*a* and the light tunnel 22 can be cooled with the airflow generated by the suctioning of the air by the light source blower 95.

The air suctioned by the light source blower 95 passes through a light source duct 96, and flows into the light source air inlets 64*b* on the holder 64 (see FIG. 4). Part of the air flowing into the light source duct 96 flows between a light source housing 97 and the outer cover 59 via an opening 96*a* formed on a surface of the light source duct 96 facing the outer cover 59 (see FIG. 19).

The air flowing through the opening 96*a* on the light source duct 96 between the light source housing 97 and the outer cover 59 cools the light source housing 97 and the outer cover 59, and then is discharged from the air outlet 85 by the discharge fan 86.

The air collected through the light source air inlets 64*b* flows into the light source 61, cools the light source 61, and is discharged from the light source air outlet 64*c* provided on the top surface of the holder 64. The air discharged from the light source air outlet 64*c* flows from an opening on the top surface of the light source housing 97 toward the air outlet 85, following a fluid guide 87. The air then flows around the second optical unit 40, becomes mixed with the low-temperature air coming into the surrounded space in the power unit 80, and is discharged from the air outlet 85 by the discharge fan 86. In the manner described above, because the high-temperature air discharged from the light source air outlet 64*c* is mixed with the external air before being discharged, the air discharged from the air outlet 85 can be suppressed from being highly heated. The fluid guide 87 does not always need to be provided. Even without the fluid guide 87, the highly heated air discharged from the light source air outlet 64*c* is discharged through the space surrounded by a main PFC power board 80*a* and a sub-PFC power board 80*b* to be explained later to the air outlet 85, via the air passing along the rear surface of the curved mirror 42 while moving from the air inlet 84 toward the air outlet 85. When the fluid guide 87 is used, the highly heated air discharged from the light source air outlet 64*c* is suppressed from moving directly near the main PFC power board 80*a* and the sub-PFC power board 80*b*. If the fluid guide is used to allow the highly heated air discharged from the light source air outlet 64*c* to avoid the main PFC power board 80*a* and the sub-PFC power board 80*b* entirely, the air is discharged from the air outlet 85 without being mixed with the air passed along the rear surface of the curved mirror 42, and the air is entirely discharged without having temperature reduced, so that the air outlet 85 becomes heated excessively. Therefore, by allowing the air discharged from the light source air outlet 64*c* and passed through the fluid guide 87 to pass through the space surrounded by the main PFC power board 80*a* and the sub-PFC power board 80*b* to some degree, such air allowed to mix with the air coming from the air inlet 84, passed along the rear side of the curved mirror 42, and moving toward the air outlet 85 reliably.

It is preferable for the operating unit 83 where a user makes operations to be provided on the top surface of the apparatus so that the user can make the operations easily. However, in the embodiment, because the transmissive glass 51 through which an image is projected on the projection surface 101 is provided on the top surface of the projector 1, the operating unit 83 needs to be provided at a position above the light source 61, viewing the projector from the Y direction.

In the embodiment, because the light source 61 is cooled by the airflow flowing from the air inlet 84 to the air outlet 85 between the light source unit 60 and the operating unit 83, and the heated air is discharged toward the air outlet, the heated air can be suppressed from moving toward the operating unit 83. In this manner, the operating unit 83 can be suppressed from being heated by the air heated by having cooled the light source 61. Furthermore, part of the air flowing from the air inlet 84 around the second optical unit 40 toward the air outlet 85 passes directly below the operating unit 83, so that the operating unit 83 is cooled. This also suppresses the operating unit 83 from being heated.

The discharge fan 86 suctions the external air through the power supply air inlet 56 provided on the base member 53 illustrated in FIG. 18 mentioned earlier. A ballast board 3a for supplying a stable power (current) to the light source 61 is provided behind the light source housing 97 in the X direction in FIG. 20. The external air suctioned through the power supply air inlet 56 moves upwardly between the light source housing 97 and the ballast board 3a, cooling the ballast board 3a. The air then flows into the surrounded space in the power unit 80 provided above the ballast board, and the air is discharged by the discharge fan 86 through the air outlet 85.

In the embodiment, because the fan for generating an airflow moving from the air inlet 84 to the air outlet 85 is provided as the discharge fan 86 on the side where the air is discharged, the amount of air supplied into the apparatus through the air inlet can be increased compared with when the fan is provided at the air inlet. This is because, if the fan is provided at the air inlet 84, the second optical unit 40 would be provided in a direction to which the air from the fan is sent, and the second optical unit 40 would reduce the amount of the external air supplied by the fan into the apparatus. By contrast, when the fan is provided as the discharge fan 86 on the side of the air outlet 85, because generally no object is provided on the side of the air outlet 85 where the air is discharged, the amount of the air discharged by the discharge fan 86 is not reduced. Because the same amount of air discharged by the discharge fan 86 is collected through the air inlet 84, the resultant amount of air supplied through the air inlet into the apparatus is not reduced. Therefore, the air can be sent from the air inlet 84 to the air outlet 85 at a given pressure, and the heated air rising from the light source 61 can be carried toward the air outlet 85 via the airflow from the air inlet 84 to the air outlet 85.

On the lower left side of the apparatus main unit in FIG. 20, the heat sink 13 in the image forming unit 10 and a cooler 120 for cooling the light source unit 60 and the light source bracket 62 are provided. The cooler 120 includes the suction blower 91, a vertical duct 92, and a horizontal duct 93.

The suction blower 91 is provided facing a lower part of the air inlet 84, and suctions the external air through the air inlet 84 from a surface facing the air inlet 84, as well as the air inside of the apparatus from a surface on the opposite side of the surface facing the air inlet. The external air then flows into the vertical duct 92 provided below the suction blower 91.

The air flowing into the vertical duct 92 moves downwardly, and sent into the horizontal duct 93 connected to the lower part of the vertical duct 92.

The heat sink 13 is provided inside of the horizontal duct 93. The air flowing through the horizontal duct 93 is brought into contact with the heat sink 13, depriving the heat sink 13 of heat. In this manner, the heat sink 13 is cooled by the air flowing through the horizontal duct 93. The heat sink 13 has a finned structure, and the air is allowed to flow through the fins. By cooling the heat sink 13, the DMD 12 can be cooled efficiently, and the DMD 12 can be suppressed from being heated excessively. The heat sink 13 is provided so as not to be brought into contact with the base member 53 so that the heat in the heat sink 13 is less communicated to the base member 53. The heat sink 13 is also configured so that the air is also allowed to flow through the space between the heat sink 13 and the base member 53.

As illustrated in FIG. 32, foot receptacles 15 to which the foot 29 is fitted into is provided on the base member 53. When the feet 29 are fitted into the respective foot receptacles 15, the feet 29 are connected to the base member 53. The foot receptacles 15 are provided outside of the horizontal duct 93 so that an airflow inside of the horizontal duct 93 is not obstructed, and so as not to receive the heat released from the heat sink 13. By providing the feet 29 and the foot receptacles 15 outside of the horizontal duct 93, the heat released from the heat sink 13 is prevented from being communicated to the image forming unit A and the projecting optical unit B via the feet 29. The foot receptacle 15 is provided in singularity between the horizontal duct 93 and the cover front surface 59b, and is provided in two on the side of the rear surface of the cover than the former foot receptacle 15. In other words, the feet 29 include a single foot 29a located nearest to the cover front surface 59b with respect to the illumination bracket 26, and two feet 29b provided nearer to the cover rear surface 59c than the foot 29a. These two feet 29b are provided on the illumination bracket 26 at an interval that is larger than the length of the heat sink 13, along a direction in which the air flows. By providing more of the feet 29 on the side of the cover rear surface 59c than that on the side of the cover front surface 59b, and arranging the feet 29b at an interval larger than the length of the heat sink 13 in the direction in which the air flows, the weight of the curved mirror 42 is supported in a well-balanced manner. As may be clearly understood from the arrangement of the foot receptacles 15, a line connecting between one of the feet 29b and the another overlaps with the heat sink 13. By providing the line connecting one of the feet 29b and the other in a manner overlapping with the heat sink 13, the installation footprint of the projector 1 can be reduced. In the embodiment, the feet 29 are provided on the image forming unit A, and fitted into the respective foot receptacles 15 provided on the base member 53, but the feet may also be provided on the base member 53, and fitted into the foot receptacles 15 formed on the image forming unit A.

The air moving through the horizontal duct 93 flows into the duct 65 or the opening 65a provided to the light source bracket 62 in the light source unit 60 illustrated in FIG. 4 mentioned earlier. The air flowing into the opening 65a further flows between the removable cover 54 and the light source bracket 62, to cool the removable cover 54.

The air flowed into the duct 65 cools the light source bracket 62; further flows into the part of the light source 61 on the opposite side of the light output; and cools the area on the opposite side of the reflecting surface of the reflector 67 in the light source 61. In this manner, the reflector 67 in the light source 61 is cooled. Therefore, the air passing through the passage 65 deprives both of the light source bracket 62 and the light source 61 of heat. The air passed near the reflector 67 passes through a discharge duct 94 that guides the air present between the height of the light source bracket 62 and the height near the bottom of the discharge fan 86; merges with the air discharged from the light source air outlet 64C; passes through the fluid guide 87; and reaches the air outlet 85. The air is then discharged by the discharge fan 86 through the air outlet 85. The air coming into a section between the removable cover 54 and the light source bracket 62 through the openings 65a cools the removable cover 54, moves inside of the apparatus, and is discharged by the discharge fan 86 through the air outlet 85.

Figure 22:
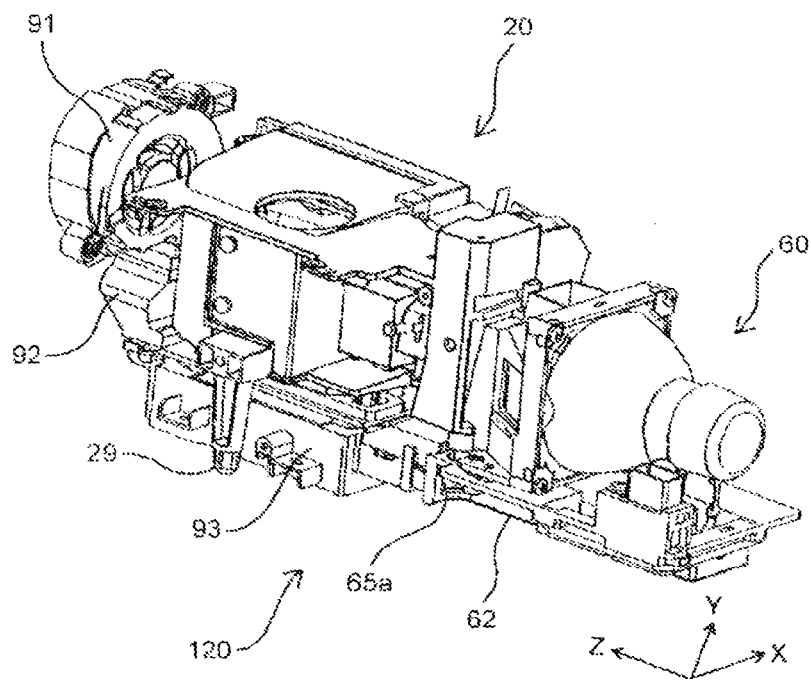
FIG. 22 is a perspective view illustrating a cooler for cooling a DMD and the like, along with the illumination unit and the light source unit.

FIG. 22 is a perspective view illustrating the cooler 120, along with the illumination unit 20 and the light source unit 60. A positional relation of the cooler, the illumination unit 20, and the light source unit 60 is as illustrated in FIG. 22.

Figure 23:
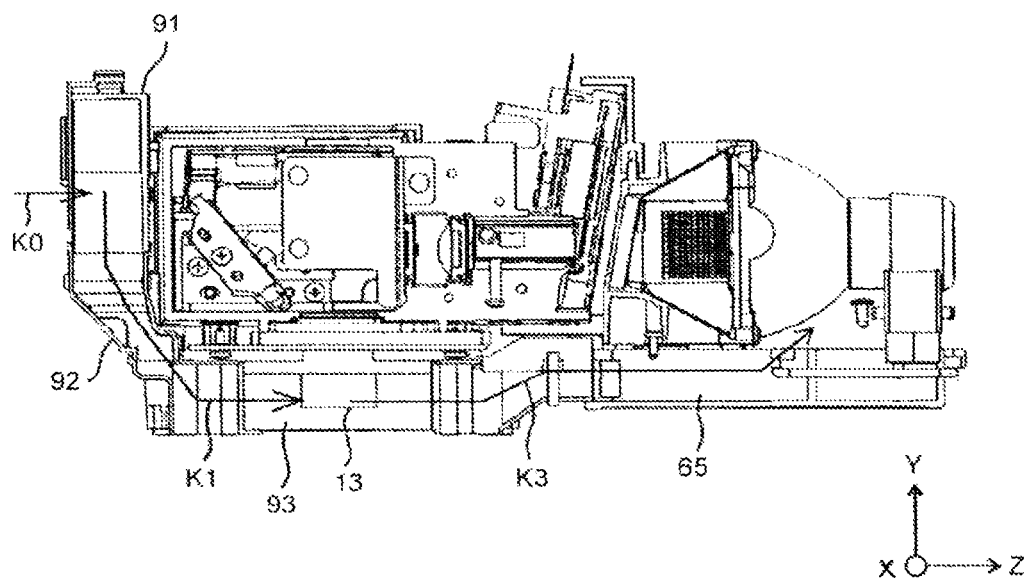
FIG. 23 is a sectional view of FIG. 22.

FIG. 23 is a cross-sectional view of FIG. 22. The air coming through the suction blower 91 flows in a manner indicated by arrows K0, K1, and K3 illustrated in FIG. 23.

Figure 24:
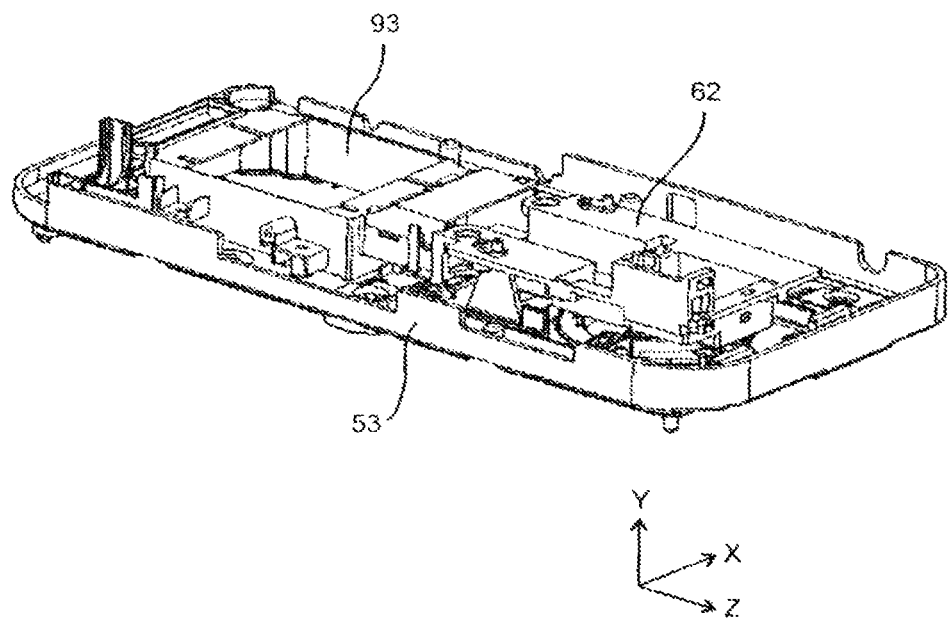
FIG. 24 is a perspective view illustrating a horizontal duct, the light source unit, and a base member.

FIG. 24 is a perspective view illustrating the base member 53, the horizontal duct 93, and the light source bracket 62.

As illustrated in FIG. 24, the horizontal duct 93 is fixed to the base member 53 of the projector 1, and a part of the top surface of the horizontal duct 93 has an opening. The image forming unit is provided on top of the horizontal duct 93 so that the heat sink 13 in the image forming unit 10 passes through the opening.

Figure 25:
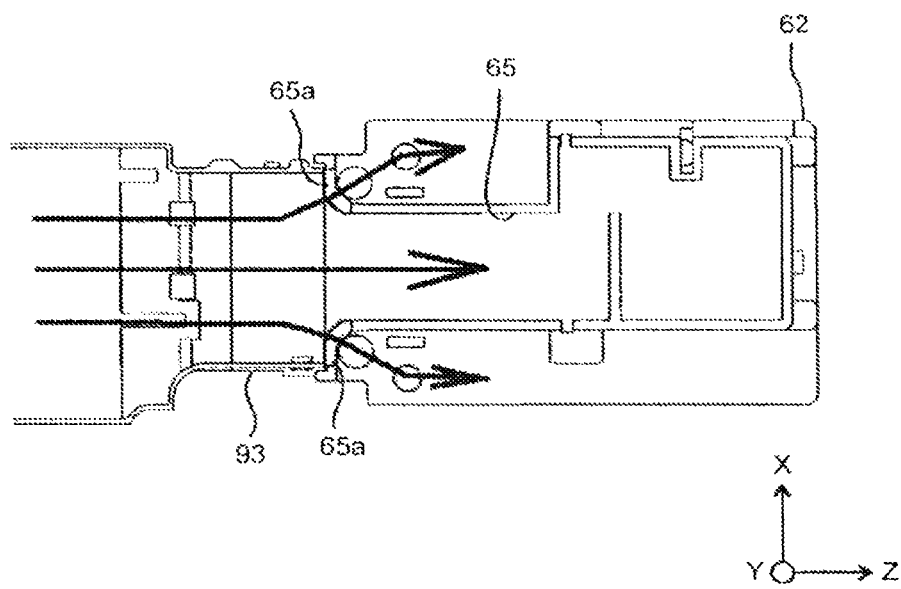
FIG. 25 is a schematic of an airflow from the horizontal duct to a light source bracket viewed from below.
Figure 26:
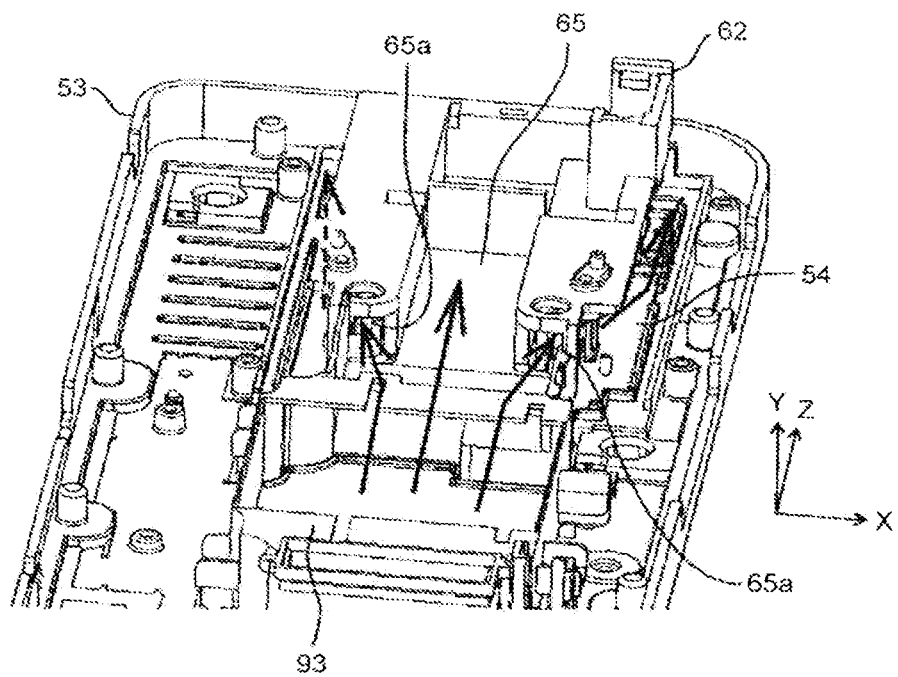
FIG. 26 is a schematic of an airflow from the horizontal duct to the light source bracket viewed from top.

FIG. 25 is a schematic of an airflow from the horizontal duct 93 to the light source bracket 62 viewed from below, and FIG. 26 is a schematic viewed from top.

As illustrated in FIGS. 25 and 26, the air moving through the horizontal duct 93 flows into the duct 65 or the openings 65a provided to the light source bracket 62 in the light source unit 60. The air flowed into the openings 65a flows between the removable cover 54 and the light source bracket 62 to cool the removable cover 54.

As illustrated in FIG. 22 mentioned earlier, it can be seen that a space for providing the horizontal duct 93 under the illumination unit 20 is created by the feet 29 on the illumination unit 20 to support the weights of the image forming unit 10, the first optical unit 30, and the second optical unit 40. In this manner, the heat sink 13 being a heat releasing unit can be provided inside of the horizontal duct 93, and the heat sink 13 can be cooled by the air. In the manner described above, the DMD 12 can be cooled well, so that a temperature increase in the DMD 12 can be suppressed.

In the embodiment, the feet are provided to the image forming unit A (the illumination bracket 26 in the illumination unit 20), but the feet may instead be provided to the projecting optical unit B or to the base member 53 being a base, for example. In such cases, a foot extending vertically from the base member 53 is provided in plurality, and the image forming unit A (illumination unit 20) is placed on and fixed to the top surface of each of the feet.

In the embodiment, as described earlier, by supporting the image forming unit A and the projecting optical unit B with the foot 29 provided in plurality, the image forming unit A and the projecting optical unit B can be supported well using a simple structure, compared with when the image forming unit A and the projecting optical unit B are supported by the outer cover 59. In this manner, the price of the apparatus can be reduced compared with when the image forming unit A and the projecting optical unit B are supported by the outer cover 59.

Furthermore, in the embodiment, the projecting optical unit B (an integration of the first optical unit 30 and the second optical unit 40) is aligned and fixed to the image forming unit A (an integration of the illumination unit 20 and the image forming unit 10), and the image forming unit A and the projecting optical unit B are supported by the feet provided on the image forming unit A. Alternatively, feet for supporting the image forming unit A and feet for supporting the projecting optical unit B may be provided separately. In such a case, the feet for supporting the image forming unit A are configured so that a space for providing the heat sink 13 being a heat releasing unit is ensured between the base member 53 being a base and the DMD 12 being an image forming element. The feet for supporting the projecting optical unit B are configured so that the projecting optical unit B is provided above the image forming unit A.

It is preferable for the weights of the image forming unit A and the projecting optical unit B to be supported at three or more points, so that the image forming unit A and the projecting optical unit B can be supported stably. Alternatively, only two feet 29 may be used to support the image forming unit A and the projecting optical unit B at three or more points. Specifically, a stick-like foot may be provided in a manner extending on the base member 53 on the front side in the X direction with respect to the illumination unit 20, and a plate-like foot may be provided to the base member 53 on the rear side in the X direction. The image forming unit A and the projecting optical unit B are then supported by these two feet that are the stick-like foot and the plate-like foot. In such a case as well, the image forming unit A and the projecting optical unit B are supported at three points that are at the stick-like foot and at least both ends of the plate-like member abutting against the base member. In this manner, the image forming unit A and the projecting optical unit B are supported at three or more points.

Furthermore, when the image forming unit A and the projecting optical unit B are supported by three feet as described in the embodiment, the image forming unit A and the projecting optical unit B can be supported stably without becoming shaky, compared with when the image forming unit A and the projecting optical unit B are supported by four or more feet.

Explained above is merely an example and the embodiments achieve advantageous effects that are unique to modes (1) to (6) described below.

(1)

In an image projection apparatus including a light source unit (light source unit 60), an image forming unit (the image forming unit A) that forms an image using light from the light source unit, and a heat releasing unit (the heat sink 13) that is provided to the image forming unit and releases the heat from the image forming unit, and projecting an image formed by an image forming unit, the image projecting apparatus, provided to install the apparatus main unit on the installation surface are a first member (base member 53) facing an installation surface, and the feet 29 supporting the image forming unit and provided on the first member on the opposite side of the installation surface so that a space is ensured with respect to the first member. The feet support the image forming unit so that the heat releasing unit is provided inside of the space, and not to be brought into contact with the first member.

Such a configuration enables the heat sink 13 to be provided between the image forming unit A and the base member 53 without being brought into contact with the base member 53, as explained in the embodiment. Furthermore, because the base member 53 receives the weight of the image forming unit A via the feet 29, the strength required in the base member 53 is reduced, compared with when the weight is received by the cover front surface 59*b* or the cover rear surface 59*c*.

(2)

The image projection apparatus having the configuration described in (1) above further includes a channel (horizontal duct 93) that guides the air from the heat releasing unit to the light source unit. The heat releasing unit is provided to be brought into contact with the air flowing through the channel, and the feet are provided not to be brought into contact with the air flowing through the channel.

Such a configuration prevents the feet 29 from receiving the heat released by the heat sink 13 and communicating the heat to the image forming unit A.

(3)

The image projection apparatus having the configuration described in (1) or (2) above further includes a projecting optical unit (the projecting optical unit B) for forming a projected image of the image formed by the image forming unit. The heat releasing unit, the image forming unit, and the projecting optical unit are arranged in the order described from the installation surface, and the feet 29 support the image forming unit and the projecting optical unit.

In this manner, the strength required in the cover front surface 59*b* or the cover rear surface 59*c* is further reduced.

(4)

In the image projection apparatus having the configuration described in (3) above, the projecting optical unit is aligned and fixed to the image forming unit, and the feet 29 are provided to the image forming unit.

Such a configuration enables the feet 29 to support the image forming unit and the projecting optical unit.

(5)

The image projection apparatus having the configuration described in either one of (1) to (4) above further includes a blower (the suction blower 91) for generating an airflow flowing from the heat releasing unit toward the light source unit by sending the air into the channel.

Such a configuration enables an airflow to be generated inside of the channel, so that the temperature of the heat releasing unit such as the heat sink 13 to be suppressed from increasing. Therefore, the image generating element such as the DMD 12 can be cooled well.

(6)

Furthermore, in the image projection apparatus having the configuration described in either one of (1) to (5) above, the projecting optical unit A is provided above the image forming unit B, and the light source 61 and the image forming unit A are arranged side by side in a direction in parallel with the plane of the projected image, and in a direction in parallel with the plane of the projected image projected on the projection surface.

Such a configuration enables the length of the apparatus in the direction perpendicular to the plane of the projected image projected on the projection surface to be reduced. In this manner, the installed apparatus is suppressed from occupying a space in the direction perpendicular to the plane of the projected image. Therefore, when the image projection apparatus is used in a manner placed on a table, for example, the apparatus is suppressed from becoming an obstacle when a table and chairs are arranged, even in a small room. Furthermore, when the image projection apparatus is used in a manner hanging from a ceiling, the image projection apparatus can be suppressed from interfering with a luminaire installed on the ceiling when the image projection apparatus is installed to the ceiling, and the image projection apparatus can be installed at a predetermined position. In this manner, highly convenient image projection apparatus can be provided.

The weight of the image forming unit acting on the feet functions as an axial force. Because a member generally has a higher rigidity to an axial force than that to a bending moment, sufficient rigidity for supporting the image forming unit can be ensured by the facing member and the feet. Therefore, according to one aspect of the present embodiment, the heat releasing unit can be provided between the image forming unit and the facing member without giving much consideration to the strength of the surface perpendicular to the installation surface, compared with a structure in which the image forming unit is fixed to the surface perpendicular to the installation surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projector, comprising:
    an outer cover;
    an image generator which utilizes light to form an image;
    a heat sink disposed at a lower side of the image generator and between the outer cover and the image generator; and
    a support, connected to the image generator and different from the outer cover, which supports the image generator within the outer cover and contacts a base of the outer cover,
    wherein the image generator, the heat sink, and the support are each within the outer cover.

2. The image projector according to claim 1, wherein the support is located at a position which does not restrict air flow which cools the heat sink.

3. The image projector according to claim 2, wherein the support is downstream of the heat sink relative to a direction of airflow which cools the heat sink.

4. The image projector according to claim 1, wherein the support includes a foot.

5. The image projector according to claim 4, further comprising a channel for cooling the heat sink,
    wherein:
    the heat sink is within the channel, and
    the foot is outside of the channel.

6. The image projector according to claim 1, further comprising an optical device to project the image from the image generator out of the image projector, wherein the heat sink, the image generator, and the optical device are arranged in this order from the base of the outer cover.

7. The image projector according to claim 6, further comprising a light source to generate the light utilized by the image generator,
    wherein the light source, the image generator, and the optical device are disposed so that a surface formed by the light source, the image generator, and the optical device faces another surface which is perpendicular to a vertical direction, the image formed by the image generator being projected onto the another surface.

8. The image projector according to claim 1, wherein the heat sink is connected to the image generator which includes a digital micro mirror device.

9. The image projector according to claim 1, wherein the heat sink does not contact the outer cover.

10. An image projector, comprising:
an outer cover;
a heat sink; and
an image generator to generate the image, the image generator contacting and vertically aligned with heat sink, the heat sink disposed at a lower side of the image generator, relative to an orientation of the image projector when the image projector is in use, the image generator having supports, different from the outer cover, which are vertical and contact the outer cover, when the image projector is in the orientation of the projector being in use, the heat sink disposed between the outer cover and the image generator.

11. The image projector according to claim 10, further comprising:
a light source; and
an optical device to project an image from the image generator out of the image projector,
wherein:
the image generator generates the image using light from the light source, and
the light source, the image generator, and the optical device are disposed so that a surface formed by the light source, the image generator, and the optical device faces another surface which is perpendicular to a vertical direction, the image formed by the image generator being projected onto the another surface.

12. The image projector according to claim 10, wherein the heat sink is connected to the image generator which includes a digital micro mirror device.

13. The image projector according to claim 10, wherein the heat sink is disposed away from the outer cover.

14. An image projection apparatus for projecting an image, comprising:
an optical system;
an outer cover; and
an image generator to generate the image, the image generator including a heat sink disposed at a lower side of the image generator, relative to an orientation of the image projection apparatus when the image projection apparatus is in an orientation in which the image projection apparatus is used, the image generator being supported at the lower side thereof by supports which are different from the outer cover, the heat sink disposed between the outer cover and the image generator,
wherein the optical system, the image generator, and the heat sink are arranged in this order from a side from which light from the image generator is projected.

15. The image projection apparatus according to claim 14, wherein:
the heat sink does not contact the outer cover.

16. The image projection apparatus according to claim 14, further comprising a light source to emit light,
wherein:
the image generator generates the image using the light form the light source, and
the light source, the image generator, and the optical system are disposed so that a first surface formed by the light source, the image generator, and the optical system faces a second surface which is perpendicular to a vertical direction, the image formed by the image generator being projected onto the second surface.

17. The image projection apparatus according to claim 14, wherein the heat sink is connected to the image generator which includes a digital micro mirror device.

18. An image generator for use in an image projection apparatus, comprising:
an image generating element to receive light in order to generate in an image; and
a heat sink to release heat generated by the image generating element,
wherein the image generating element is supported from a lower side thereof by supports which are different from an outer cover, and the heat sink is below the image generating element, when the image projection apparatus is in an orientation in which the image projection apparatus is in use.

19. The image generator according to claim 18, wherein:
the heat sink does not contact the outer cover.

20. The image projector according to claim 1, further comprising:
an optical device to project the image generated by the image generator, the optical device contacting an upper side of the image generator.

* * * * *